US008294568B2

(12) United States Patent
Barrett

(10) Patent No.: US 8,294,568 B2
(45) Date of Patent: Oct. 23, 2012

(54) WIRELESS MINE TRACKING, MONITORING, AND RESCUE COMMUNICATIONS SYSTEM

(75) Inventor: James P. Barrett, Liberty Lake, WA (US)

(73) Assignee: Venture Corporation Limited, Singapore (SG)

( * ) Notice: Subject to any disclaimer, the term of this patent is extended or adjusted under 35 U.S.C. 154(b) by 359 days.

(21) Appl. No.: 11/775,831

(22) Filed: Jul. 10, 2007

(65) Prior Publication Data

US 2008/0137589 A1 Jun. 12, 2008

Related U.S. Application Data

(60) Provisional application No. 60/806,919, filed on Jul. 10, 2006.

(51) Int. Cl.
*G08B 1/08* (2006.01)
(52) U.S. Cl. ............. 340/539.11; 340/572.1; 340/573.1; 342/451
(58) Field of Classification Search ............... 340/539.1, 340/500, 531, 539.11
See application file for complete search history.

(56) References Cited

U.S. PATENT DOCUMENTS

| 6,339,709 | B1 * | 1/2002 | Gladwin et al. ........... 455/115.1 |
| 7,102,510 | B2 * | 9/2006 | Boling et al. ............ 340/539.13 |
| 7,280,483 | B2 * | 10/2007 | Joshi ............................ 370/238 |
| 2003/0214411 | A1 * | 11/2003 | Walter et al. ............... 340/573.4 |
| 2005/0079818 | A1 * | 4/2005 | Atwater et al. .............. 455/41.2 |
| 2005/0088301 | A1 * | 4/2005 | Abbruscato ............. 340/539.32 |
| 2005/0264416 | A1 * | 12/2005 | Maurer .................... 340/539.13 |
| 2006/0202832 | A1 * | 9/2006 | Reznik et al. .............. 340/572.7 |
| 2007/0264967 | A1 * | 11/2007 | Collins et al. ............. 455/404.2 |

\* cited by examiner

*Primary Examiner* — Brian Zimmerman
*Assistant Examiner* — Sara Samson
(74) *Attorney, Agent, or Firm* — Craig M. Stainbrook; Stainbrook & Stainbrook, LLP

(57) ABSTRACT

An intrinsically safe accurate location information network for personnel and assets in underground mines, including wireless access points and subnetwork controllers, active wireless locator/messenger tags, network controller(s), and enterprise servers running application control software. The wireless access points are installed in mine entries and crosscuts and track the active wireless locator/messenger tags. The active tags may be worn by mine personnel or installed in mining equipment. The network subsystems form relay networks that wirelessly carry telemetry and control data without the need to penetrate the earth. The subsystems determine the location of persons and assets underground and monitor safety-related information, which can be used for disaster avoidance, early warning of impending disaster, and improved rescue effectiveness.

27 Claims, 13 Drawing Sheets

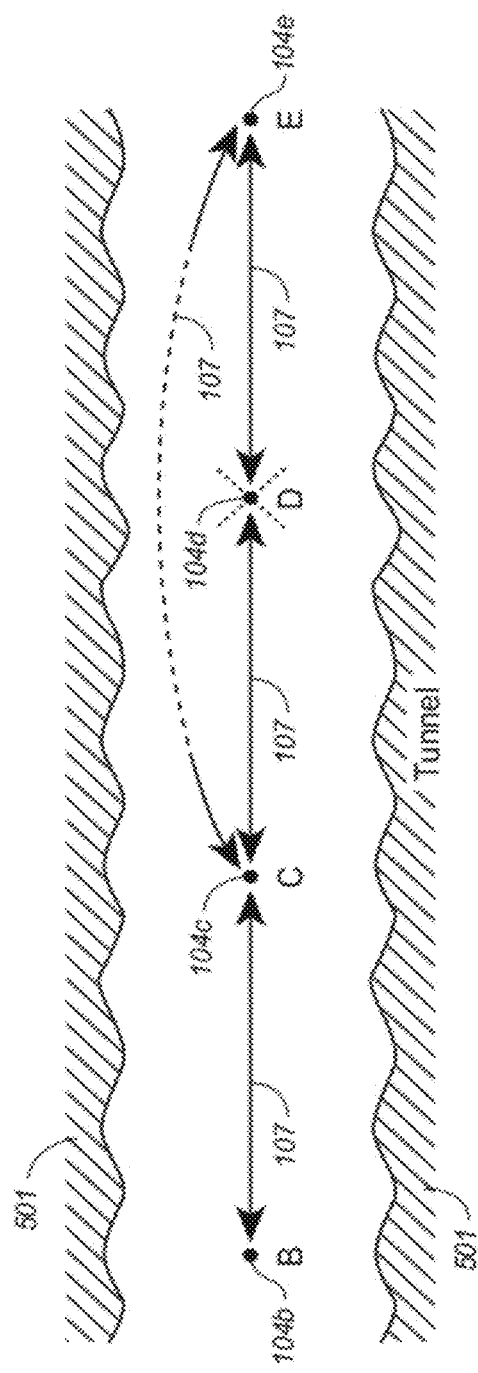
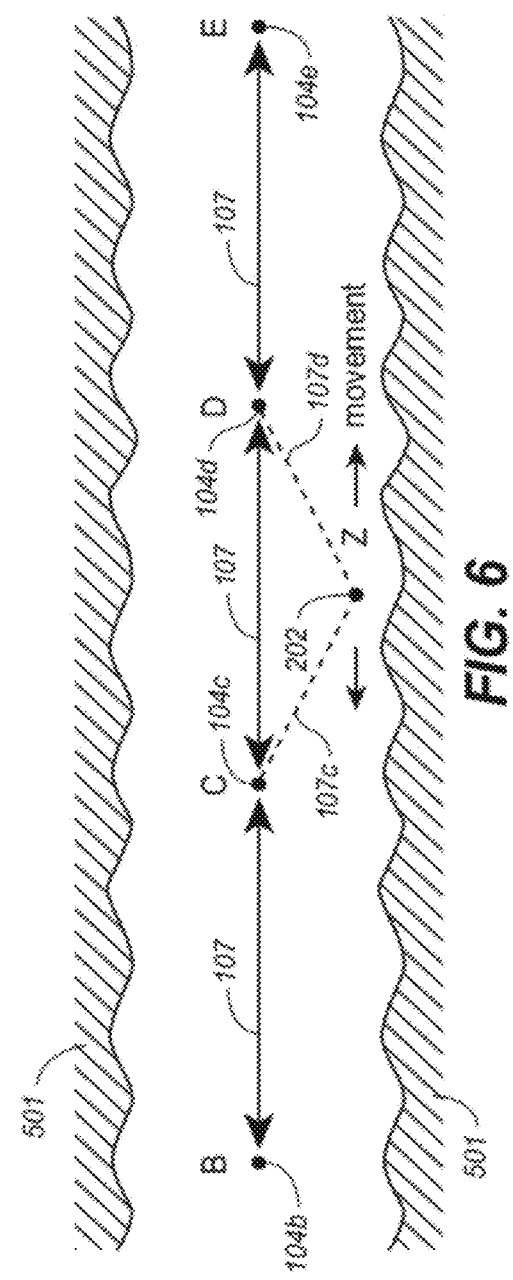

WIRELESS MINE TRACKING, MONITORING, AND RESCUE COMMUNICATIONS SYSTEM

CROSS REFERENCES TO RELATED APPLICATIONS

The present application claims the benefit of the filing date of U.S. Provisional Patent Application Ser. No. 60/806,919, filed Jul. 10, 2006.

SEQUENCE LISTING

Not applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND INFORMATION AND DISCUSSION OF RELATED ART

1. Field of the Invention

The present invention relates generally to wireless communication systems, and more particularly to a system for use in deep underground mines to track and monitor personnel and equipment, and to provide wireless two-way communications for day-to-day miner safety enhancement and for rescue operations.

2. Discussion of Related Art

There are numerous risks inherent in underground mining operations: fire, cave-in, methane or coal-dust explosion, flooding, asphyxiation, and so forth. When miners are trapped, the success of rescue operations depends upon the rapidity and the efficiency of the rescue response. Both would be greatly enhanced if mining operators implemented a suitable underground communications and personnel tracking system.

There are numerous difficulties in using the current location-finding devices in an underground environment. GPS technology simply does not work. GPS satellites transmit low power radio signals, denominated L1 and L2. The L1 frequency is for civilian GPS systems and operates at 1575.42 MHZ in the UHF band. However, the signals are line-of-sight, and though they can pass through clouds and generally transparent materials, they will not penetrate solid objects such as buildings and earth.

Moreover, there are numerous challenges in using wireless communications generally for underground use. Until the present, there has not existed a wireless communication system capable of functioning as a backhaul method in underground environments. And it is difficult to use radio frequency propagation devices in underground environments as the basis for an accurate location algorithm because underground environments tend to block signals, cause multipath fading, co-interference, hardware/package degradation, environmental damage due to dust, water, and the like. Further, there are difficulties in implementing large-scale distributed wireless networks and hybrid wired/wireless networks in underground environments, especially given the generally linear and labyrinthine configurations of most tunnel and mine structures, and due to the presence of signal blocking machinery. Moreover, there are the challenges in achieving the following objectives: (1) acceptable "location update rate" performances with large-scale mine footprints having a large number of miners across low bandwidth backhaul networks (e.g. existing long-haul RS485 at 2400 bps); (2) providing a system requiring only a low power demand suitable for all-battery operation in some areas; (3) adequate fault-tolerance for a solution aimed at protecting/saving human life, especially where the deployment environment is harsh and hazardous; and (4) sufficient portability and rapid deployment characteristics needed in emergency rescue scenarios.

SUMMARY OF THE INVENTION

The present invention has been developed to answer the needs set out in the Mine Improvement and New Emergency Response Act of 2006 (MINER Act), S.2803 [109th], signed by President George W. Bush on Jun. 15, 2006. The MINER Act of 2006 requires, in pertinent part, that each mine operator develop and implement an accident response plan within 60 days of the enactment of the Act. Among the plan requirements, mine operators must implement a two-way wireless communications and tracking system. The requirements for post accident communications include redundant means of communication with the surface for trapped miners and others underground, such as secondary telephone or equivalent two-way communication. The requirements for post-accident tracking entail that mine operators adopt a system consistent with commercially available technology and any applicable physical constraints of the mine that allows for above-ground personnel to ascertain the current and/or immediately pre-accident location of all underground personnel. The system must be reliable and serviceable in a post-accident setting.

In addition the present invention has been designed to meet the requirements of Title 30, Code of Federal Regulations, relating to the interconnection of Mine Health and Safety Administration (MSHA) evaluated mine-wide monitoring systems and MSHA approved longwall mining systems. It is particularly adapted to meet the requirements of 30 CFR Part 18, relating to the need to reduce the risk of fire and explosion hazards in mine environments, and is intended for favorable evaluation of intrinsic safety under MSHA Program Circular PC-4003.

The system of the present invention meets the requirements of the MINER Act of 2006 and 30 CFR by providing an intrinsically safe accurate location information system for personnel and assets in underground mines. The system enables two-way communications of emergency information across a wide underground coverage area. In summary terms, the system consists of wireless access points and subnetwork controllers, active wireless locator/messenger tags, network controller(s), and optional enterprise servers running application control software. The wireless access points are installed in the entries and crosscuts of underground mines to track the active transponder devices and to make emergency communications available to miners. The active tags are wearable by personnel entering and exiting mines. Likewise, they can be attached to the equipment moving into, used throughout, and exiting mines.

The system of the present invention utilizes completely un-tethered wireless peer-to-peer radio/computer subsystems, such as Zigbee nodes, in underground tunnels in the mining environment to form robust relay networks that wirelessly carry telemetry and control data without the need to penetrate the earth. While ZigBee nodes are preferred, other and future high level communication protocols are contemplated, as long as they are devised for use with compact low-power digital radios based on a standard accepted for wireless personal area networks (WPANs), and having a long battery life and secure networking.

The peer-to-peer radio/computer subsystems and networks of the inventive system are engineered to determine the location of persons and assets underground, using characteristics of standard routing/relay machinery in innovative ways, but also using some entirely novel methodologies.

The present invention makes it technically possible and economically feasible to monitor an array of safety-related information which can be quickly acted upon to save lives. These advantages arise from several features of the invention, including: (a) the invention allows for monitoring for unsafe conditions, thus facilitating proactive avoidance of some disasters; (b) the invention allows for early warning of some impending disasters so that workers can escape safely; and the invention allows for vastly improved rescue effectiveness in those unfortunate situations where avoidance or escape is not possible. This latter advantage arises because when using the present invention, trapped or imperiled workers can be readily located in the aftermath of an incident, and this allows authorities to quickly provide appropriate assistance and/or rescue. Secondarily, the present invention enables a host of other mine monitoring/management functions which help improve operational effectiveness at the mines and thereby enhance the general market acceptance of the invention.

The wireless mine monitoring and rescue communications system of the present invention also uses a set of permanently mounted tags in fixed locations throughout the mine as calibrators and self-test devices to enhance the reliability of the system. The system software logs the status and communications of all active tags along with their physical location. The system also self-monitors health-check parameters that contribute to a continuous self-assessment of network status. When predetermined thresholds are reached, the system automatically takes corrective action, triggers alarms as appropriate, issues trouble alerts, and otherwise manages the network and all connected devices.

The inventive system is designed for high fault-tolerance in the particularly harsh environments of coal mines. The system incorporates several types of redundancy and fail-over capability as a means of maximizing up-time even in the face of many accident and disaster scenarios. Indeed, mine accidents should have no appreciable adverse affect on the operation of the inventive system. Even in the event of a worst-case collapse or explosion that destroys a portion of the network, most of the system will continue to operate normally. Hypothetical fault analysis shows that at least 90% of the mine-wide network will likely remain operational in even the most severe situations. This continuing operation allows the communications personnel tracking to continue in the post-accident time period, across all but the most severely damaged sections. Even if a sub-part of the network becomes inoperative in a disaster, the damaged portion can have its functionality effectively replaced, either by automatic self-healing of the wireless network, or by a rescue team entering that area with a portable "rapid deployment" version of the system (to replace a failed subnet, for example).

An additional feature of the present invention allows a rescue team to use a handheld "location sniffer" in a standalone hand-carried mode to rapidly find people in the affected area. In rescue scenarios, this location sniffer is able to detect and identify beacon signals from a miner many hundreds of feet away, depending on tunnel conditions.

The present invention can also collect wireless sensor data on many other kinds of safety related information, such as atmospheric conditions (methane, CO, etc), temperature, water levels and the like. It employs extensible architectures that facilitate the incorporation of future developments, improvements, and enhancements, such as monitoring of miner biometrics, and/or enhanced short-message two-way communications.

The system of the present invention is intended for use with both regular mine operation and emergency situations. The following features are notable:

Network Redundancy: The backbone wireless subnetworks (each called a "subnet") can be laid out as either standard self-healing networks or in double redundant topology. The network topology is configurable by the network-planner or installer before the installation. Nominally each subnet consists of 25 wireless access points (WAPs) which cover approximately 5000 linear feet of tunnel entry and crosscut per subnet. This may be easily increased in size and scope ("up-scaled") to service a mine of any size.

Miner Location Time: In even the largest mines, the inventive tracking and communications system can determine the location of every single miner every 30 seconds. Under presently developed configurations, up to 65,000 uniquely identifiable tags can be used in any one mine.

Networks Configurations for Special Circumstances: In certain environments, such as in congested lifts or mine train stations where a large number of miners collect in relatively small spaces, special subnet controllers may be programmed into a "high speed sweep" mode. In this mode the locations of dozens or even hundreds of miners can be determined every few seconds.

Battery Backup: Wireless Access Points utilized in the present invention are typically powered using hybrid battery-plus-wired-power methods (with battery backup), though they can be can be configured in some areas for all-battery operation (as indicated by portability needs, economic considerations, and other factors). Both options are suitably engineered for safety in the harsh and hazardous mine environment.

Portability and Ease of Installation: A rapid deployment all-battery version of the inventive system may be deployed for special circumstances where there is a need to heal a worst-case post-accident failure of some part of the system network.

Scalability Using Added Subnets: Each location subnet generally includes 25 access points plus a subnet controller, installed in approximately 5000 feet of tunnel. Each subnet can handle up to a few hundred miners in the immediate vicinity at any given time. Subnets can be added and interconnected to cover any mine size and any practical number of miners. Backhaul methods include RS485 or DX-V-Bus as standard, but support for leaky feeder, fiber, cable, ethernet, Wifi, and CANBus backhauls can also be arranged according to the specific characteristics and size of the target mine.

The inventive system may be used slightly differently in the three contemplated applications:

Regular Operation: The system records miner location and status information, and communicates alert information. It also continuously self-monitors the entire network for proper functioning. The user interface is highly powerful, yet designed to be highly intuitive so as to make actionable safety information entirely intelligible at all times. The standard user interface in the present invention is accessible via any standard client-based web-browser. Views are organized to provide data in the most simple and effective manner possible. The highest level and simplest view of location data, for example, is via "tag" symbols populating a graphical mine map. Where relevant, drill-down into progressively higher levels of detail is provided via simple point-and-click actions with a mouse. Advanced administrator functions are also provided for system managers. While system software and above-ground IT infrastructure is generally hosted and managed at the mine site, aggregations of data from multiple mines can be optionally provided offsite, with the data accessed and the system managed remotely over the Internet via subscription service. The latter may be an attractive option for some large mine operators.

Post Emergency "Backup" Operation: When a catastrophic emergency arises, or when ventilation falters or fails, or when main power is interrupted, all wireless access points and subnet controllers in the inventive system operate in an "intrinsically safe mode" and draw power from their integral backup batteries. This ensures that 100% of the system is safe to operate in any post-accident scenario. Specific system subnetworks can be deployed in permissible areas, and others less expensively in the normally fresh-air areas, but all configurations provide 100% intrinsically safe operation in the post-accident or post-ventilation-failure scenarios when an entire mine would be considered hazardous.

The inventive system self-monitors and will report the status of all access points before, during, and after a disaster event. In a worst-case disaster scenarios, where parts of the network service may be interrupted or destroyed, the system will attempt to automatically self-heal (using state-of-the-art methods such as "failed node hop-over", "adoption of orphaned nodes", and "ring fault repair". If parts of the network are unable to self-heal, then the zones with unconnected access points will remain initially inoperable but will nonetheless indicate the areas of the most serious disruption so that they can be repaired or their inoperability mitigated by manual human intervention (rescuers/searchers using the repair subnet or "location sniffer" for example).

The system captures the immediate pre-accident location and status of all personnel and subsequently tracks any movement of personnel in the areas of the system network that remain operational. Even in the event of a worst-case accident, it is calculated that 90% of the system network will remain operational and allow two-communications and tracking of people as they make their way to safety or otherwise respond to the event.

Emergency Rescue Operation: In this scenario part of the system is damaged due to worst-case mine collapse or explosion. When this occurs, a rescue team can bring in the rapid-deployment portable subnet, comprising battery-operated wireless access points, to restore and repair system tracking capability in the affected zone. The system is able to differentiate the portable access points from the pre-installed access points, and will adopt the new subnet appropriately. Additionally, or alternatively, a portable hand-carried "location sniffer" can be used to quickly detect the location of people in affected areas of the mine where normal service may have been interrupted. Additionally, a separate portable rapid-deployment network of all-battery-powered nodes can be deployed by the rescue team over a couple miles of tunnel distance, and operated in "RescueComm or ReachComm" mode, to provide full-roaming voice services and data services for the rescue team during the rescue operation.

OBJECTS AND ADVANTAGES

It is therefore a principal object of the present invention to provide a wireless mine tracking, monitoring, control, and rescue communications system that includes self-monitoring of all wireless infrastructure, with some over-the-air or over-the-wire reconfiguration/reprogramming, which also guarantees high reliability and low maintenance cost.

It is another object of the present invention to provide a real-time display of link quality on a digital link quality meter within the node being deployed to ensure that deployments of peer-to-peer radio links are robust in difficult and variable tunnel environments, around corners, where obstructions exist, and the like. This is especially critical in rapid deployment scenarios.

Still another object of the present invention is to provide a wireless mine monitoring/control and rescue communications system that includes remotely aware and remotely actuated, "bounce power" hard reset capability for each subnet, thus yielding high fault-tolerance and high uptime through rapid remote response to hardware or software failures.

Yet another object of the present invention is to provide a wireless mine monitoring/control and rescue communications system that has support for 100% battery-only operation, or hybrid battery-plus-wired-power operation of underground networks.

Another object of the present invention is to provide a wireless mine monitoring/control and rescue communications system that has a distributed computing architecture for high-speed data acquisition and control over huge mine/tunnel topologies.

An even further object of the present invention is to provide a wireless mine monitoring/control and rescue communications system that includes flexible architecture that easily integrates into a broadband backhaul, such as fiber, ethernet, and the like.

Yet another object of the present invention to provide a wireless mine monitoring/control and rescue communications system that provides safe underground battery-change methodology for unsafe explosive atmospheres in mines.

Another object of the present invention is to provide a wireless mine monitoring/control and rescue communications system that includes networking architecture designed to be fault-tolerant against hardware and system failures, specific self-healing and fail-over methods, along with use of "ring" architectures.

A still further object of the present invention is to provide a wireless mine monitoring/control and rescue communications system that has networking architecture designed to be disaster tolerant (against cave-ins, explosions, and so forth).

Another object is to provide peer-to-peer routing algorithms modified to add "RSSI/LQI threshold" as a hop candidate "qualifier", thus ensuring that only robust links are used in dynamic routing.

Another object of the present invention to provide a wireless mine monitoring/control and rescue communications system that includes use of a motion detector, and/or tilt sensor as a "shutoff mechanism", in addition to optimized sleep-beacon-sleep processes, to aid in the battery life/efficiency of the mobile location transponders.

Yet another object of the present invention to provide a wireless mine monitoring/control and rescue communications system that includes portable "rapid deployment subnet" options for rescue use in locating rescuers and miners.

A still further object of the present invention is to provide a wireless mine monitoring/control and rescue communications system that features a portable rapid deployment rescue communications system to carry voice and data services.

Another object of the present invention is to provide a wireless mine monitoring/control and rescue communications system that offers adjunct wireless integration of rescuers' walkie talkie systems that enables bi-directional connection of a rescue team "cluster of rescuers" to the surface, so that they have un-tethered communication to and from the surface.

Still another object of the present invention is to provide a wireless mine monitoring/control and rescue communications system that has a handheld "miner location sniffer" option for rescue use in locating miners or victims, especially in the case where tunnel cave-ins or explosions have destroyed part of the normal location system network.

Another object of the present invention is to provide a wireless mine monitoring/control and rescue communications system that utilizes battery-frugal, wireless, and "location-aware" sensors that can be placed within the underground wireless networking infrastructure. This enables a host of such sensor types, including mine atmosphere, mine environmental condition, miner biometrics, miner location, asset location, and many others. This also includes the adjunct wireless and battery operated sensors which allow monitoring of critical environmental and safety parameters during rescue operations.

A further object of the present invention is to provide a wireless mine monitoring/control and rescue communications system that has numerous battery-frugal and wireless actuator devices enabled—such as miner paging, turn-on fan/turn-off equipment, sound alarm, direct evacuation, and so forth.

A still further object of the present invention is to provide a new and improved wireless mine monitoring/control and rescue communications system that has an LCD display-based paging and/or short message communications service enabled by the bi-directional wireless infrastructure, and un-tethered communications for mining personnel (bi-directional).

Another object of the present invention is to provide a wireless mine monitoring/control and rescue communications system that has a "panic button" built in to the mobile location transponder. This allows an injured miner, or one otherwise needing to summon emergency assistance, to do so with the simple push of a button. The system software is immediately aware of both the location and identity of the miner, as well as his need for assistance, and issues alarms and signals accordingly.

Yet another object of the present invention is to provide a wireless mine monitoring/control and rescue communications system that provides un-tethered voice-message service (short messages) from the miner to the surface via an inexpensive messaging appliance.

A still further object of the present invention is to provide a wireless mine monitoring/control and rescue communications system that provides each miner's helmet with integral alarm message indicators (LEDs).

Another object of the present invention is to provide a wireless mine monitoring/control and rescue communications system that includes miniature long-life location transponders for worn by miners or affixed to equipment and other assets.

Yet another object of the present invention is to provide a wireless mine monitoring/control and rescue communications system that includes methods for high speed location tracking and determination for a large numbers of miners in highly congested areas, as well as a novel browser-based graphical user interface allowing simple drag-and-drop of wireless location infrastructure symbols upon representative mine maps for intuitive rendering of location info (node relative), miner identity, status, and the like.

Still another object of the present invention is to provide a wireless mine monitoring/control and rescue communications system that has a user interface including drill-down from the highest country-wide level to the lowest sensor level, as well as automated alarming, real-time trend graphing of parameters, and trouble dispatch.

Another object of the present invention is to provide a wireless mine monitoring/control and rescue communications system that addresses common RF propagation problems in underground tunnels, including absorptive loss effects, multipath, other constructive/destructive interference effects, waveguide effects, tunnel bend effects, and blockages.

A still further object of the present invention is to provide a wireless mine monitoring/control and rescue communications system that has RF propagation problems properly characterized and understood for use in proximity to and around long-wall mining machinery.

A still further object of the present invention is to provide a wireless mine monitoring/control and rescue communications system that includes high-accuracy location algorithms utilizing RF vector-gradient, physical-tunnel-boundary knowledge, automated RF self-calibration of individual transponder ID and specific wearer characteristics, human movement heuristics, probabilistic triangulation based on various RF propagation parameters, and various filtering and historical smoothing methods.

Another object of the present invention is to provide a wireless mine monitoring/control and rescue communications system that utilizes autonomous and distributed computing methods such as "tag-table build, push, wipe" for rapid re-discovery/updating of the location of thousands of miners/assets in even huge mines every 30 seconds.

A still further object of the present invention is to provide a wireless mine monitoring/control and rescue communications system that addresses RF propagation effects for propagation through mine-safe plastic packages/enclosures.

Yet another object of the present invention is to provide a wireless mine monitoring/control and rescue communications system that uses an innovative method for traversing RF-blocking barriers, such as steel ventilation control doors, using an "antenna-coupled joiner cable."

Another object of the present invention is to provide a wireless mine monitoring/control and rescue communications system that provides a method of safety enhancement by checking miners into and out of the mine using a cross-check of the detected mobile location transponder ID against a barcode reader at the check-in station.

A still further object of the present invention is to provide a wireless mine monitoring/control and rescue communications system that includes methods of automated daily health-check-monitoring, of all mobile location transponders, using processes which run on the existing wireless infrastructure network.

Another object of the present invention is to provide a wireless mine monitoring/control and rescue communications system that has support for both turnkey self-hosted installations, and subscription service business models.

A still further object of the present invention is to provide a wireless mine monitoring/control and rescue communications system that is capable of peer-to-peer radio relay in tunnels, thus allowing non-earth-penetrating wireless networking.

Another object of the present invention is to provide a wireless mine monitoring/control and rescue communications system that is easy, quick, and economical to install because wireless battery operated sensors and wireless networking nodes can simply be set in place and do not need wiring infrastructure for power or communications.

A still further object of the present invention is to provide a wireless mine monitoring/control and rescue communications system that offers bi-directional networking/data-communications for both into-mine and out-of-mine movement of messages. This feature is not possible with RFID technologies.

Still another object of the present invention is to provide a wireless mine monitoring/control and rescue communications system that is highly accurate in providing miner location services (2-25 meters), compared with a crude zonal accuracy of 200-10,000 meters.

A further object of the present invention is to provide a wireless mine monitoring/control and rescue communications system that provides whole mine updating of the location of hundreds or thousands of miners within 30 seconds.

Still a further object of the present invention is to provide a wireless mine monitoring/control and rescue communications system that is tamper-proof by being automatically self-aware of the status and locations of all elements of the system.

Another object of the present invention is to provide a wireless mine monitoring/control and rescue communications system that utilizes heuristics, filtering, time averaging, calibration, use of human movement and tunnel boundary data, in addition to statistical analysis of RF parametrics, thus allowing for a much more accurate location estimate than provided in prior technology.

A further object of the present invention is to provide a wireless mine monitoring/control and rescue communications system that provides support for both subscription service hosting, as well as for turnkey self-hosted businesses, which reduces economic barriers to entry for many cash poor mine owners.

Another object of the present invention is to provide a wireless mine monitoring/control and rescue communications system that is self-calibrating.

Possible uses for the present invention include: miner location; mine monitoring and control, including asset location services; rescue team assistance in locating victims of mine disasters or other mishaps; monitoring underground nuclear waste storage facilities; monitoring and control of trains, subways and/or their tunnel environments/processes; locating inmates and guards in a prison environment; asset location/monitoring of any type in below-ground or above-ground environments; indoor location services of any type, enabling the kinds of applications indoors that GPS enables outdoors; SCADA systems of any type; automatic meter reading; industrial monitoring and control; and Homeland Security and Border Patrol.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention.

BRIEF DESCRIPTION OF THE FIGURES

The invention will be better understood and objects other than those set forth above will become apparent when consideration is given to the following detailed description thereof. Such description makes reference to the annexed drawings wherein:

FIG. 5 is a schematic diagram of a self-healing hop-over concept;

FIG. 6 is a schematic diagram of a roaming tail hand-over structure;

DETAILED DESCRIPTION OF THE INVENTION

The following detailed description of the invention is best understood by referring to the included drawings wherein like items are labeled with like reference designators.

Figure 1:
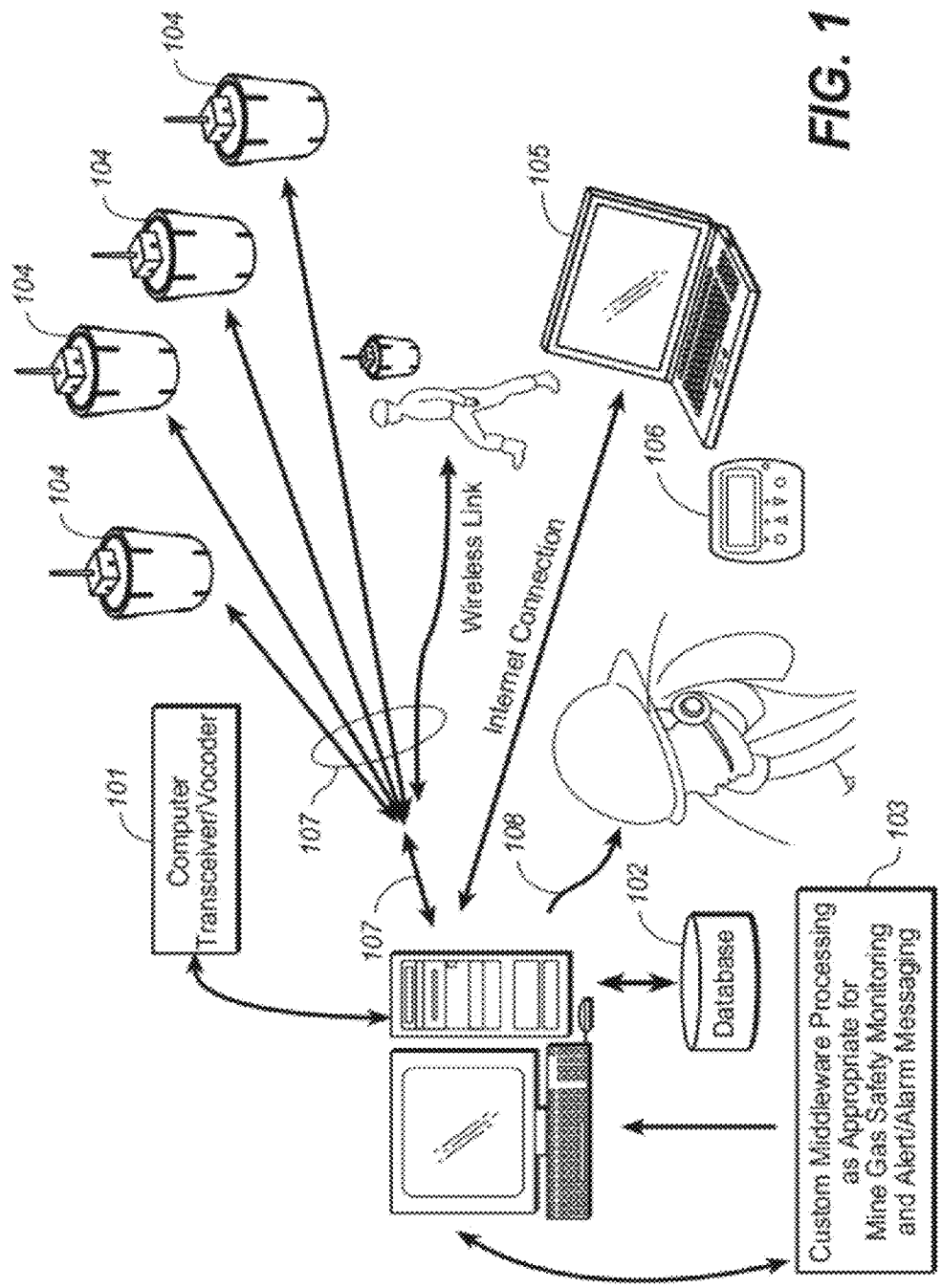
FIG. 1 is a schematic diagram providing an overview of the wireless coal mine safety communications system of the present invention.

Referring first to FIG. 1, which a schematic block diagram providing an overview of the wireless coal mine safety communications system of the present invention, it will be seen that a computer/transceiver/vocoder 101 is linked to a storage system database 102 which can be internal to computer/transceiver/vocoder 101 or externally linked to computer 101. Computer 101 operates under the control of custom software 103.

Custom software 103 includes instructions for controlling each bi-directional network communications link 107 (used for communications with a subnet made up of one or more wireless peer-to-peer radio/computer subsystems 104), as well as bi-directional communications link 108 (used for communications with one or more portable bi-directional pager/short-message device 106). Additionally, custom software 103 contains instructions to control Internet connections made via a RescueComm/ReachComm tail, 109, which is a computer/transceiver/voice applicant used by a rescuer to access the system of FIG. 2. In this way, custom software 103 provides a graphical user interface to remotely located Internet browsers operating on such access devices as a personal computer 105 or other network capable access device. Custom software 103 also includes instructions for controlling read/write access to data contained in storage system database 102.

Figure 2:
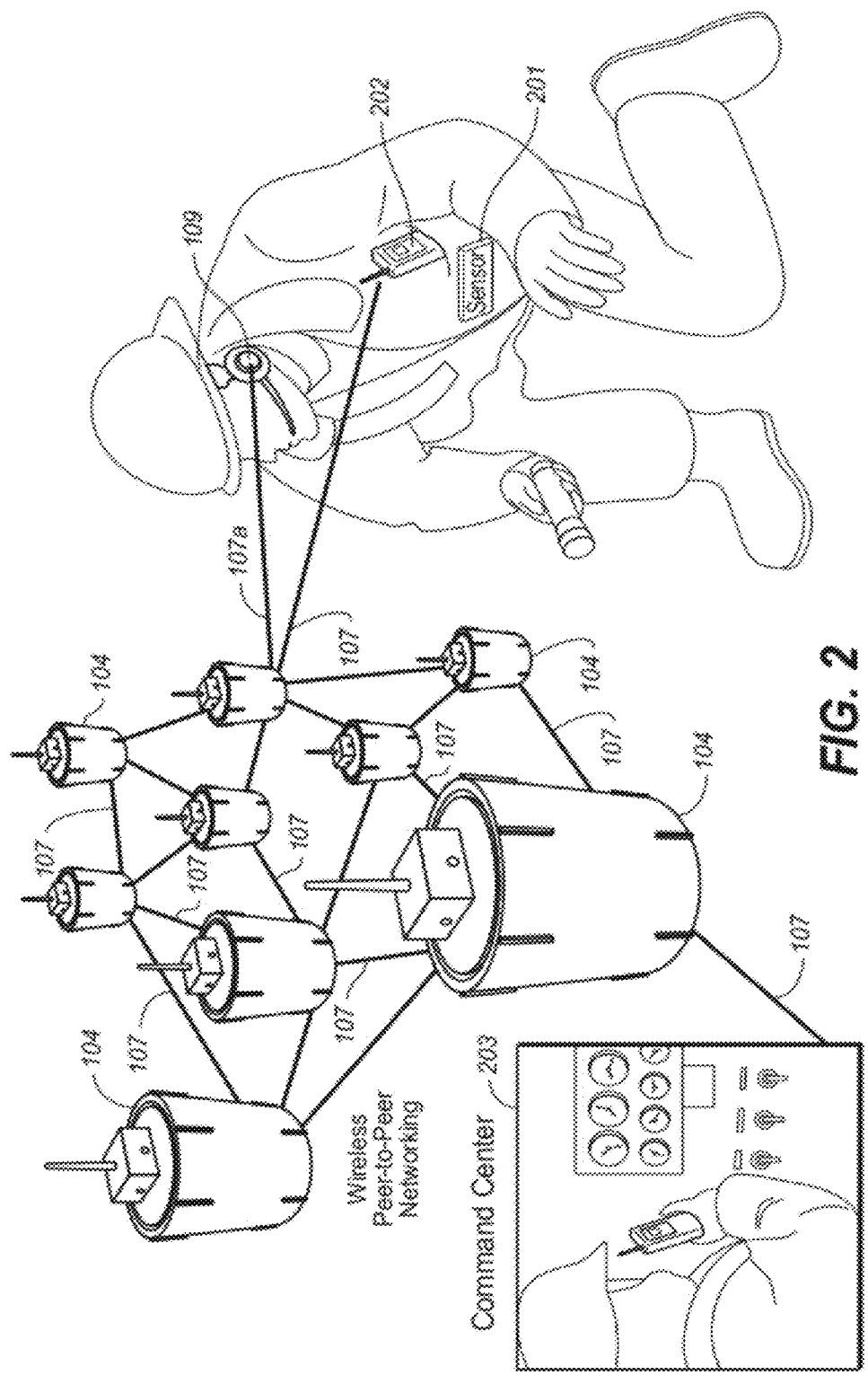
FIG. 2 is a schematic diagram showing the rescue communications and voice/data intercom system employed in the present invention.

While performing the functions related to system communications, custom software 103 also provides a graphical user interface that allows users to view, in real time, system attributes and performance metrics, as well as the location and status of system components (including mobile components, such as the wireless peer-to-peer radio/computer subsystems (wireless access points or "WAPs") 104, and mobile location transponders, 202 in FIG. 2, worn by personnel). In this way, an individual person can monitor the entire network status along with the locations of each network node and mobile asset. This information can be visibly overlaid on a geographic map representation of the entire network, showing, for instance, the physical layout of mine tunnels and the locations of miners within each tunnel.

Myriad data types may be handled by the custom software, though the principal types included for tracking and communications in a standard package include: Tag ID (miner #), Name, Access Rights, Time Stamp, Miner Location, Asset Location, Emergency Status, Tag Health, Network Health, Battery Condition, Alarm Conditions, Alert Conditions, Specified Thresholds, and various System Administration Settings. Optional data types may be included as desired and needed in custom installations and as requested by the mine operator. Data is presented in various views depending on the data type (examples including graphical maps or table views), but data can also be easily exported to other applications for integration into legacy systems.

Referring next to FIG. 2, we see a schematic block diagram of the rescue communications and voice/data intercom system employed in the present invention. In this diagram, computer 101 is located inside command center 203 and communicates directly and wirelessly with one or more wireless peer-to-peer radio/computer subsystem 104 via a bi-directional network communications link 107. One wireless peer-to-peer radio/computer subsystem 104 can be configured to work with others to create a self-healing daisy-chained and/or peer-to-multiple peer wireless subnet. A single link between computer 101 and one instance of wireless peer-to-peer radio/computer subsystem 104 via a bi-directional network communications link 107 is all that is necessary for computer 101 to be made available to all instances of wireless peer-to-peer radio/computer subsystem 104 that are wirelessly linked into the same subnet via their own bi-directional network communications link 107.

Note that wireless peer-to-peer radio/computer subsystem 104 can be stationary (as a semi-permanently placed network node/sensor/controller) or mobile (mounted on a vehicle or attached to a person).

In the preferred embodiment, each wireless peer-to-peer subsystem includes a subnet controller and a plurality of wireless access points (described more fully in connection with FIGS. 9-12). The subnet created when multiple instances of wireless peer-to-peer radio/computer subsystem 104 are semi-permanently installed and placed into communication with one another is a self-healing network with the ability to communicate with mobile and non-mobile instances of wireless peer-to-peer radio/computer subsystem 104 from each installed instance (placement) of a wireless peer-to-peer radio/computer subsystem 104. This means that as a rescuer travels along the path where instances of wireless peer-to-peer radio/computer subsystem 104 have been installed, the rescuer is able to maintain continuous voice and data communications to/from computer/transceiver/vocoder 109 to/from computer/transceiver/vocoder 101.

Due to the portable wireless, battery-powered operation of wireless peer-to-peer radio/computer subsystem 104, the wireless access points of the system can be easily walked to a convenient appropriate location and installed very quickly. This makes emergency rapid deployment of one or more subnets possible without the need to spend time wiring and providing power to multiple network node devices. In this way, for instance, in a mine rescue emergency, computer 101 can be placed in communication with a first instance of a wireless peer-to-peer radio/computer subsystem 104, and from the beginning location of this first instance, a chain of other individual instances of wireless peer-to-peer radio/computer subsystem 104 can be rapidly and easily deployed along the way as rescuers proceed toward the emergency location. Two way voice communications are made through head-set transceiver unit 109 which has a bi-directional communication link 107a with the subsystem 104. These elements allow rescuers to maintain real time two-way communications with personnel at command center 203. Additionally, as each wireless peer-to-peer radio/computer subsystem 104 is placed, a location map develops automatically due to the location-awareness of wireless peer-to-peer radio/computer subsystem 104.

Also shown in FIG. 2 is the sensor 201 optionally in communication with radio frequency transceiver module (mobile location transponders) 202. Miners and rescuers can wear this transponder device as they work in a mine. Radio frequency transceiver module 202 communicates with any instance of wireless peer-to-peer radio/computer subsystem 104 (or with any instance of a handheld location sniffer, as described in FIG. 4) via its own bi-directional network communications link 107. Radio frequency transceiver module 202 has an internal processor that enables location awareness through analysis of the received signal strength indication (RSSI) of received radio frequency signals generated by nearby instances of wireless peer-to-peer radio/computer subsystem 104. Since each instance of wireless peer-to-peer radio/computer subsystem 104 includes a self-identifying set of symbols in transmissions, radio frequency transceiver module 202 is aware of the unique identity of each instance of wireless peer-to-peer radio/computer subsystem 104 with which it communicates.

When in communication with an instance of wireless peer-to-peer radio/computer subsystem 104, radio transceiver module 202 can send data messages back to, and receive data messages from, computer 101 via the subnet consisting of the one or more instances of wireless peer-to-peer radio/computer subsystem 104. When connected to sensor 201, radio transceiver module 202 can pass the information collected by sensor 201 back to computer 101 in real time as necessary.

In a preferred embodiment of the transceiver module 202 worn by mine personnel, the devices are powered by a lithium ion wafer battery with a nominal battery life of two years. In keeping with the inherently safe design standards implemented in much of the instant invention, the batteries can be replaced only by technicians. The transponder beacon interval is every 5 seconds at a transmit frequency/modulation/power of 2.4 GHz-DSSS-1 milliwatt peak, and 1 microwatts average. The typical range for communications and tracking with such devices is approximately 300 feet, with a 500 feet maximum. Alert signals may be of four types, all initiated with a button press, and include: (1) extreme emergency; (2) minor emergency: (3) non-emergency checkout to remote area; and (4) cancel. In its current configuration, the transponder is 2×3.6×0.9 inches in a rugged polycarbonate and silicone rubber enclosure. It may be mounted in several ways with appropriate mounting apparatus on a miner's belt, helmet, pocket, breather, fanny pack, and the like, according to the preferences of the miner and the mine operator.

Further, in the preferred embodiment, the wireless access points of the wireless peer-to-peer subsystem are powered by DC 7-24VDC wired power primary (for fresh air area installations), and DC 7-12VDC isolated supply (I.S.) wired power primary (for permissible areas), having a DC 3.6-4.0VDC I.S. lithium battery (backup battery) DC 3.6-4.0 VDC I.S. lithium/caplamp untethered option. The power connection is a 12 AWG 2-conductor twisted pair MSHA, and operation continues uninterrupted for 48-96 hours after disconnect. The data/communications connection is 100% wireless. It has a transmit frequency/modulation/power of 2.4 GHz-DSSS-50 milliwatt. The antenna is a built-in chip antenna that transmits through the wireless access enclosure. The data type is packet data with a transmission rate of 250 kbit/second, and a range for peer-to-peer network communications of greater than 500 feet, though the wireless access points are normally spaced no more than 150-200 feet to ensure strong link budget and "hop-over of one failed node." In such a configuration, the location accuracy in "defined" coverage areas (i.e., within the entry or crosscut where a subnet is deployed) is +/−1 node spacing (200 feet typical) with 95% degree of confidence. The location accuracy in "supplemental" coverage areas (i.e., those outside of the entry/crosscut where a subnet is deployed) ensures that a location is known to be within 500 feet of any node(s) that "heard" the miner's beacon, again with 95% degree of confidence. The wireless access points provide seven types of alert signals using a high intensity strobe disposed on the apparatus housing, including: (1) flashing red, signifying extreme danger and calling for immediate evacuation; (2) solid red, signifying danger and requiring that personnel prepare for evasive action and call; (3) flashing yellow, calling for someone to acknowledge a miner's extreme alert; (4) solid yellow, calling for someone to acknowledge a miner's minor alert; (5) flashing green, signifying all is well, return to normal operations; (6) solid green (quick)—acknowledging a checkout; and (7) solid green (long), calling for someone to contact the mine office or dispatcher. The preferred housing is currently 6.3×10.2×4.2 inches, and fabricated from fiberglass reinforced polycarbonate. The mounting is a chain mounting with a uni-strut for affixing the housing to roof bolts or plates or wire mesh.

Figure 3A:
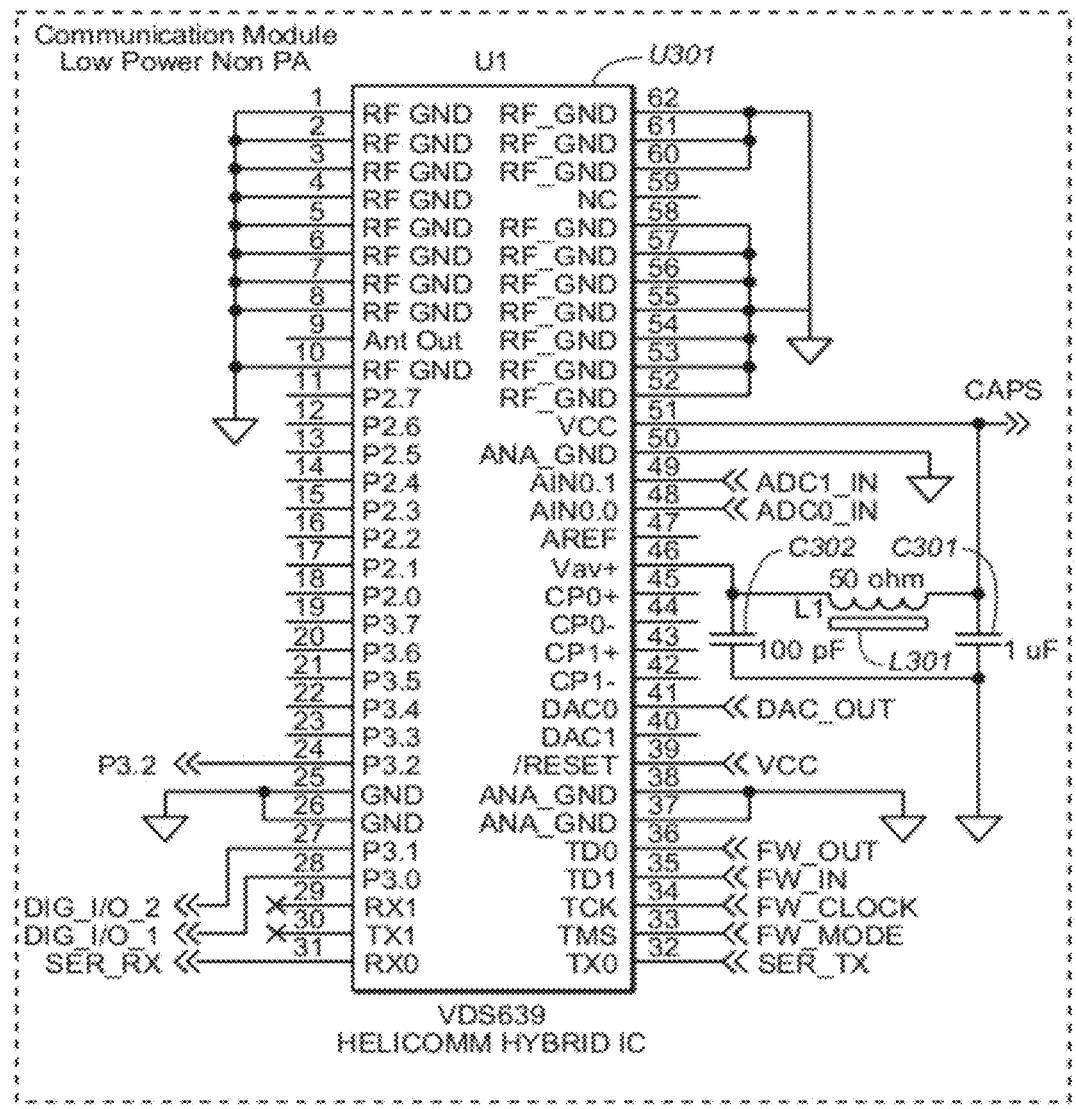
FIGS. 3A through 3F comprise electronic schematic diagrams of the various operational elements of the radio transceiver module utilized in the present invention.
Figure 3B:
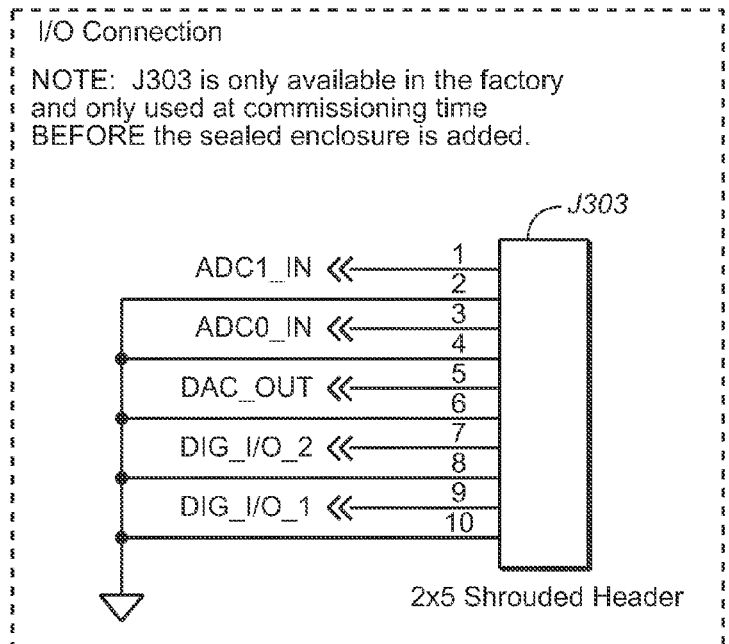
Figure 3C:
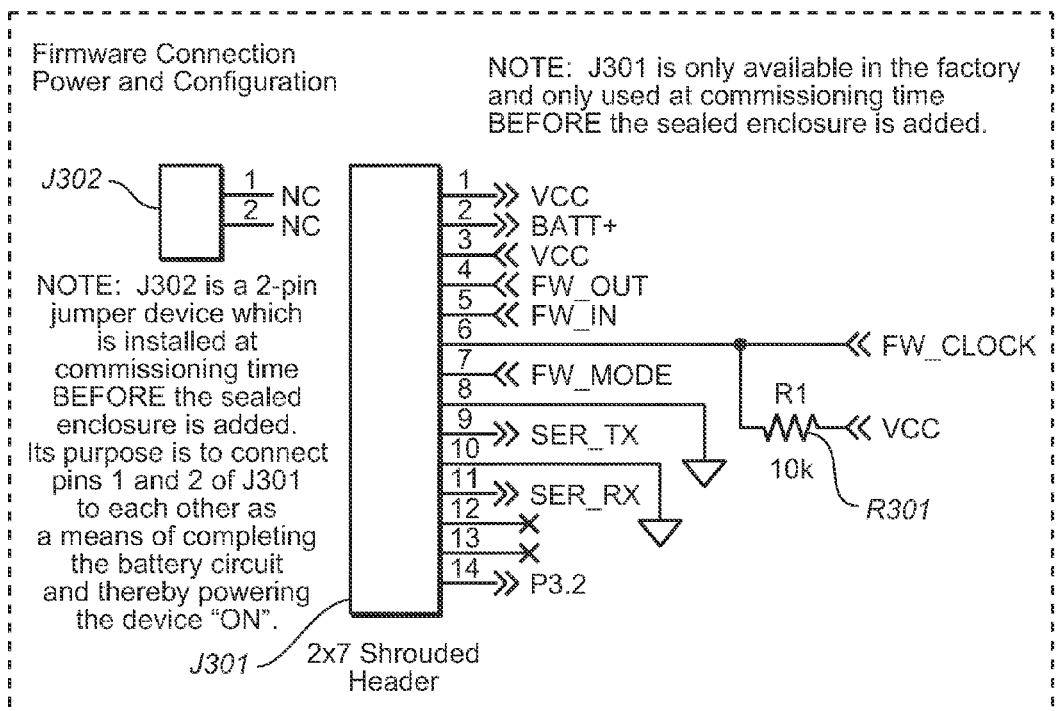

Referring next to FIGS. 3A-F, electronic schematic diagrams of radio transceiver module 202 are shown. Referring first to FIGS. 3A through 3C, it can be seen that hybrid integrated circuit (IC) U301 is a combination radio frequency transceiver and micro controller used to communicate wirelessly with external compatible devices. IC U301 uses as its antenna a specially dimensioned printed circuit board 'pad' to which pin 9 (Ant Out) is directly connected when IC U301 is mounted on the circuit board.

Circuit ground for IC U301 is provided through pins 25, 26, 37 and 38. RF ground is provided through pins 1 through 8 and pin 10, as well as pins 52 through 57 and 60 through 62. Analog ground is provided through pins 37, 38 and 50.

Pins 11-23, 29, 30, 42-45, 47 and 59 of IC U301 are not used. Pins 24, 27, 28, 29, 32-36, 39, 41 and 48 of IC U301 are used only during the initial commissioning of the module (when programming the processor and configuring the module settings). Connectors J303 and J301 are where these pins are connected. Connectors J303 and J301 are used to connect external control and power systems to the module during the initial commissioning process.

Figure 3D:
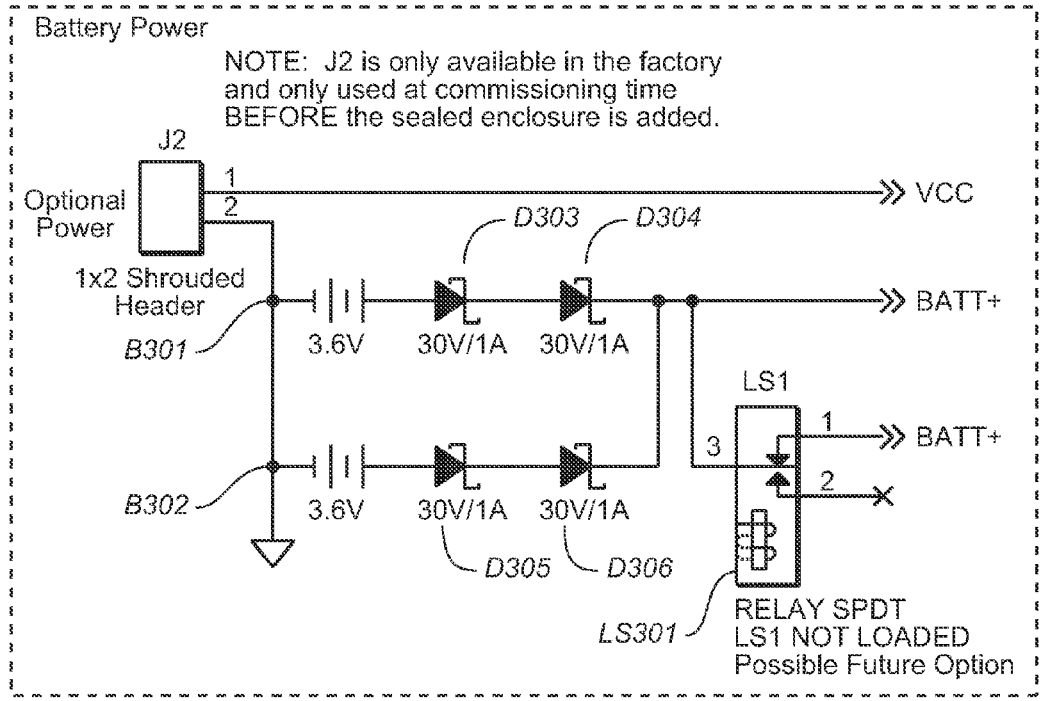
Figure 3E:
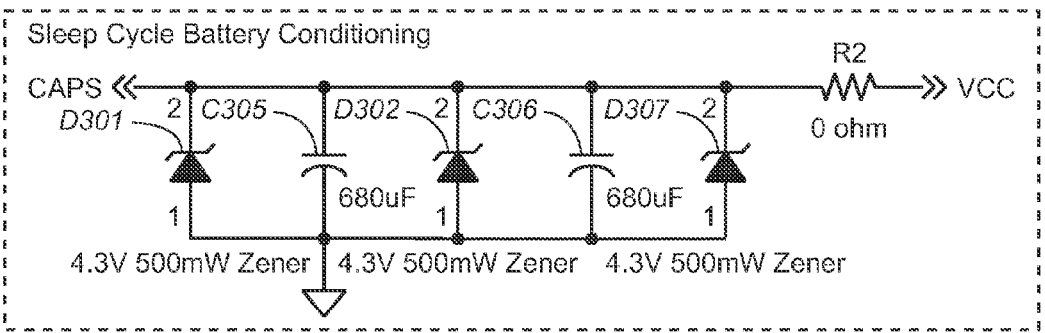
Figure 3F:
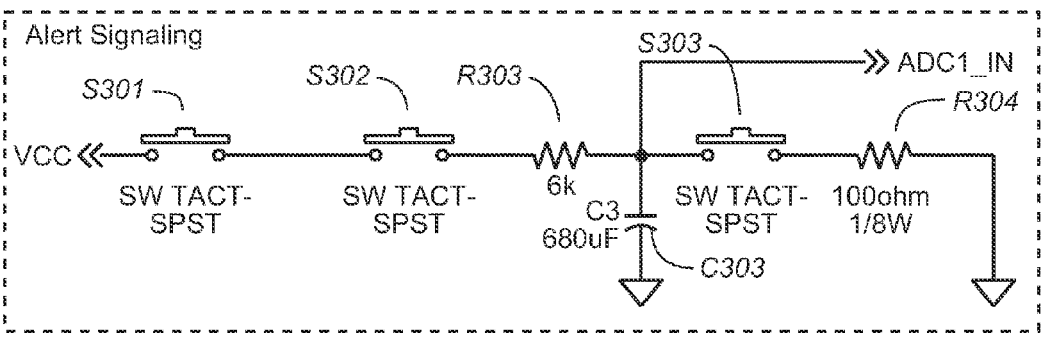

Referring now to FIG. 3F, radio transceiver module 202 has an alert signal trigger capability through switches S301 and S302. When both of these momentary-on switches are pressed simultaneously, the voltage from the VCC source is made available through resistor R303 to the top of capacitor C303, thus charging the capacitor to full voltage. Capacitor C303 is used to "memorize" the fact that the alert signal switches (S301 and S302) have been pressed by the miner. In effect this capacitor forms a sample-and-hold function, with the capacitor voltage being read by the high-impedance 12-bit ADC on board IC U301 via the connection between the top of capacitor C303 and pin 49 (ADC1_IN) of IC U1. The "cancel alert" function is invoked by rapidly discharging capacitor C303 to ground through R304 by pressing momentary-on switch S303.

When a miner carrying transceiver module 202 has an emergency, the alert signal can be triggered by simultaneously pressing switches S301 and S302. When both of these momentary-on switches are pressed simultaneously, the logic contained in IC U301 recognizes the condition. This is because the voltage at pin 49 (ADC1_IN) is raised to the level of VCC, and this condition is measured by the internally integrated analog-to-digital converter of IC U301. When the internally integrated micro controller of IC U301 polls the analog-to-digital converter (this is regularly done at very short intervals), the high voltage condition is reported back to the micro controller, thus making the logic in the micro controller aware of the condition. Once the micro controller is aware of this condition, it automatically causes IC U301 to make a radio frequency transmission that contains data that uniquely identifies the transceiver module 202 that is transmitting, as well as data indicating that there is an emergency related to this miner and the location of the miner. The emergency transmission is received by the nearest wireless peer-to-peer radio/computer subsystem 104, which (via the wireless data subnet consisting of multiple instances of wireless peer-to-peer radio/computer subsystem 104 as seen in FIG. 2 along with computer 101 as seen in FIG. 1) passes the message back to computer 101. This allows users monitoring mine conditions at computer 101 to see immediately that the miner has an emergency, and where the miner is located. Because each individual instance of transceiver module 202 has a unique digital identity, it is possible for a mapping to occur in computer 101 that links each individual instance of transceiver module 202 with the name and function of the miner who is carrying it. If the miner realizes that the emergency transmission was unintentionally triggered, or that there is no actual emergency, pressing the "cancel alert" button switch S303 will cause a rapid reduction in the voltage at pin 49 (ADC1_IN), which is detected by the internal components of IC U1 (as described above). This causes IC U1 to immediately make a radio frequency transmission that contains an "emergency cancelled" data message, along with the unique identity of the instance of transceiver module 202 that made the transmission. When this message reaches computer 101 (via the wireless subnet described in FIG. 2), computer 101 informs those monitoring the mine status that the emergency alert has been cancelled.

Referring next to FIG. 3D, Pin 51 (VCC) of IC U301 is connected to the VCC/BATT+ power source (+3.6 VDC) provided by batteries B301 and B302 operating in parallel with double redundant blocking diodes, D303, D304, and D305, D306, to protect against back-loading EMF from one battery into the other. Optional relay LS301, when used, provides a magnetically operated 'Off' switch that can be used to automatically turn the unit off when the unit is placed on a magnetic surface.

Now referring to FIG. 3E, a sleep cycle battery conditioner circuit is shown, comprising power conditioning capacitors C305 and C306 and zener diodes D301, D302, and D307. Together, these components stabilize power spikes that occur when IC U1 "awakens" and makes a very brief radio frequency transmission ("beacon on") before retuning to "sleep" mode. Power conditioning capacitors C305 and C306 are necessary to decouple the batteries from the brief higher energy demand of the "beacon on" interval (the few milliseconds when IC U301 transmits radio frequency signals. Triple shunt zener diodes D301, D302, and D307, keep the voltage across capacitors C305 and C306 below 4.3V, even in the case of unlikely buildup of static charge.

Pin 46 of U301 is connected to one side of inductor L301, and the other side of inductor L301 is connected to the top of zener diodes D301, D302 and D307 (and thereby, the VCC/BATT+ power source (+3.6 VDC) provided by batteries B1 and B2). Capacitors C301 and C302 filter audio and radio frequency components from the DC power arriving at pin 46 of IC U301.

Figure 4:
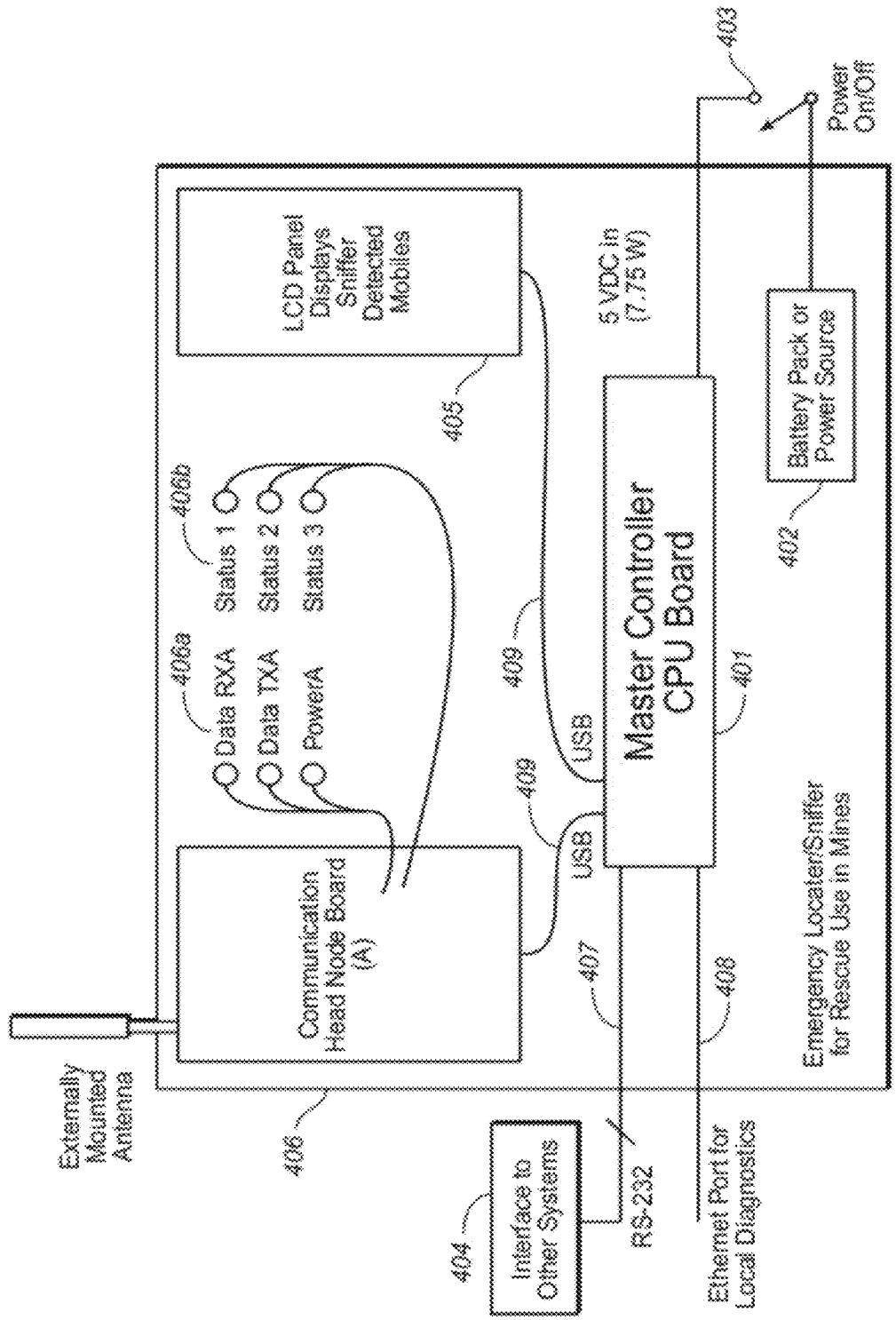
FIG. 4 is a schematic diagram of a emergency location sniffer.

Referring next to FIG. 4, there is shown a schematic block diagram of an emergency location sniffer. In this diagram, it can be seen that a CPU board 401 acts as a master controller that receives its direct-current (DC) power from battery pack 402 via switch 403. CPU board 401 communicates with external systems via RS-232 interface 404. CPU board 401 communicates with LCD panel 405 via a first USB interface 409. CPU board 401 communicates with head node board 406 via a second USB interface 409.

Still referring to FIG. 4, head node board 406 has a radio frequency transceiver that uses an externally mounted antenna with which to receive and transmit radio frequency signals. Head node board 406 sends digitized representations of the RSSI of received signals to CPU board 401 via USB interface 409. When uses as a miner location 'sniffer' (as in the case of a mine rescue operation), the transceiver of head node board 406 sends to CPU board 401 the RSSI of the received signal being transmitted by a radio frequency transceiver module 202 (carried on the person of a miner). Along with this information, head node board 406 sends to CPU board 401 the binary data modulated onto the radio frequency signal transmitted by radio frequency transceiver module 202, including the unique digital identity of the transmitting instance of radio frequency transceiver module 202.

Upon receiving the information provided by head node board 406, CPU board 401 displays on LCD panel 405 the unique identity of each transmitting instance of radio frequency transceiver module 202, as well as its RSSI.

Head node board 406 also provides the user with indications of the status of the DC power, as well transmit and receive data activity through a set of labeled light-emitting diodes (LEDs) 406a, 406b, mounted so as to be externally viewable on the surface of the chassis containing head node board 406. Additional externally viewable LEDs are provided (controlled by head node board 406) that indicate a status condition that is received as part of a data message transmitted by radio frequency transceiver module 202. The meaning of each status condition is user-definable.

In this configuration and feature set, the emergency location sniffer shown in FIG. 4 can be used to locate a missing miner who is carrying (or is nearby a) radio frequency transceiver module 202.

Now referring to FIG. 5, there is shown a schematic diagram of a self-healing hop-over concept. In this diagram, instance B of wireless peer-to-peer radio/computer subsystem 104b is in communication with instance C of wireless peer-to-peer radio/computer subsystem 104c via a bi-directional network communications link 107. Similarly, instance C of wireless peer-to-peer radio/computer subsystem 104c is in communication with instance D of wireless peer-to-peer radio/computer subsystem 104d via a bi-directional network communications link 107. Additionally, instance D of wireless peer-to-peer radio/computer subsystem 104d is in communication with instance E of wireless peer-to-peer radio/computer subsystem 104e via a bi-directional network communications link 107. All instances of wireless peer-to-peer radio/computer subsystem 104b-104e are located inside the earth tunnel bounded by tunnel wall 501.

Referring still to FIG. 5, it can be seen that, if instance D of wireless peer-to-peer radio/computer subsystem 104d fails, instances C and E of wireless peer-to-peer radio/computer subsystem, 104c and 104e, respectively, recognize the loss of signal from instance D, and then begin immediately to communicate wirelessly with one another directly via a bi-directional network communications link 107. This hop-over link recovery technique is possible due to the intelligence built into the wireless peer-to-peer radio/computer subsystem 104.

Now referring to FIG. 6, a schematic diagram of a roaming tail hand-over structure is shown. In this diagram, instance B of wireless peer-to-peer radio/computer subsystem 104b is in communication with instance C of wireless peer-to-peer radio/computer subsystem 104c via a bi-directional network communications link 107. Similarly, instance C of wireless peer-to-peer radio/computer subsystem 104c is in communication with instance D of wireless peer-to-peer radio/computer subsystem 104d via a bi-directional network communications link 107. Additionally, instance D of wireless peer-to-peer radio/computer subsystem 104d is in communication with instance E of wireless peer-to-peer radio/computer subsystem 104e via a bi-directional network communications link 107. Again, all instances of wireless peer-to-peer radio/computer subsystem 104b-104e are located inside the longwall mine earth tunnel bounded by tunnel wall 501. Radio frequency transceiver module 202 is in motion, located somewhere between instances C and D, 104c and 104d, respectively, of wireless peer-to-peer radio/computer subsystem. Radio frequency transceiver module 202 is initially in communication with instance C of wireless peer-to-peer radio/computer subsystem 104c via bi-directional network communications link 107c.

Still referring to FIG. 6, it can be seen that instance C of wireless peer-to-peer radio/computer subsystem, 104c, will see a reduction in the signal strength of signals transmitted by radio frequency transceiver module 202 as the module moves away from instance C, 104c, and towards instance D, 104d, of wireless peer-to-peer radio/computer subsystem. Inversely, instance D, 104d, of wireless peer-to-peer radio/computer subsystem will see an increase in the signal strength of signals transmitted by radio frequency transceiver module 202 as the module moves away from instance C and towards instance D. Because instances C and D of wireless peer-to-peer radio/computer subsystem, 104c and 104d, are in direct communication with one another via a bi-directional network communications link 107, they are able to negotiate a hand-over of the communications with radio frequency transceiver module 202 to instance D of wireless peer-to-peer radio/computer subsystem when the quality (signal strength) of bi-directional network communications link 107d exceeds the quality of bi-directional network communications link 107c.

Figure 7A:
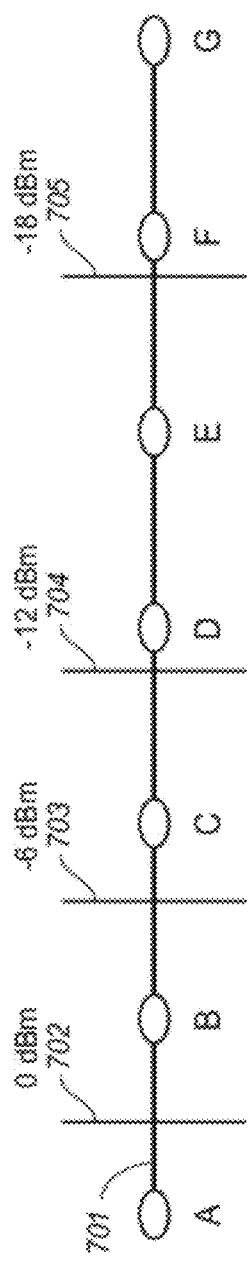
FIGS. 7A and 7B are schematic diagrams showing the RF propagation range and self-healing fault tolerance of the present invention.
Figure 7B:
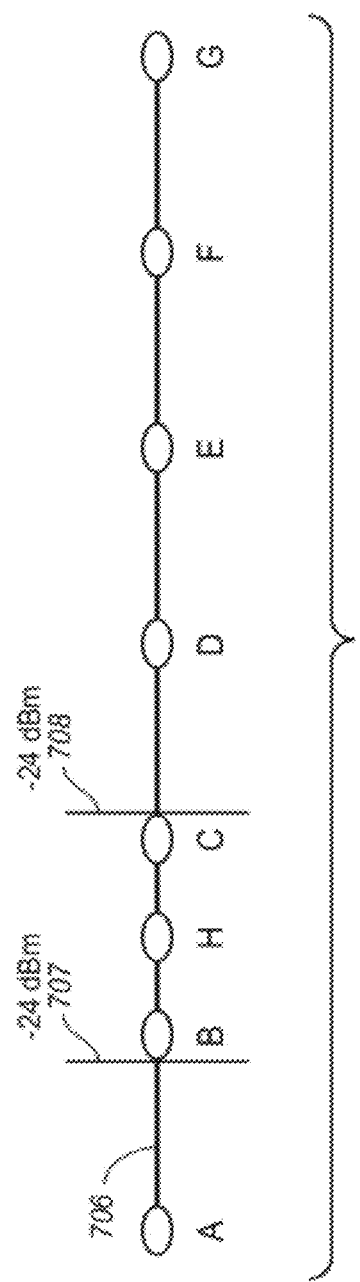

Referring next to FIGS. 7A and 7B, there are shown schematic diagrams of the RF propagation range and self-healing fault-tolerance of the present invention. In these diagrams, a wireless daisy-chained network 701 having plurality of wireless nodes A through G (each an instance of the above-described wireless peer-to-peer radio/computer subsystem 104). Nodes A through G of daisy-chained network 701 are physically and geographically separated from one another by a distance of approximately 100 meters, and are positioned along a generally straight line of a total distance of approximately 600 meters. Similarly, daisy-chained network 706 is configured with nodes A through G spaced at approximately 100 meters from one another, and further includes network node H positioned between nodes B and C.

If node G is assumed to be the transmitting unit under consideration, it can be seen that when node G of daisy-chained network 701 transmits at a power level of −18 dBm (16 microwatts), the usable-quality signal has a range that reaches to a location just past node F. When node G transmits at a power level of −12 dBm (63 microwatts), the usable-quality signal has a range that reaches a location just past node D. When node G transmits at a power level of −6 dBm (250 microwatts), the usable-quality signal reaches just past node C. When node G transmits at a power level of 0 dBm (1 milliwatt), the usable-quality signal reaches just past node B. Thus, it can be seen that by increasing its radio frequency power output level in a controlled manner, an instance of wireless peer-to-peer radio/computer subsystem 104 can extend its reach to more distant network nodes if necessary to automatically recover from the loss of one or more nearby network nodes. Similarly, by reducing its radio frequency power output level in a controlled manner, an instance of wireless peer-to-peer radio/computer subsystem can contract its reach to limit it to only the nearest network nodes to automatically handle the return to operation of one or more nearby network nodes. This automatic self-healing of the network is particularly important in a mineshaft environment where a fire or cave-in could damage one or more of the network nodes. When such an event occurs, there is little or no time for network repair and configuration activities (nor is it likely that a network repair person is going to be on location at the right time with the right equipment and tools for the troubleshooting and repair job).

Referring to FIG. 7B, it can be seen that when node H of daisy-chained network 706 transmits at a power level of −24 dBm (4 microwatts), the usable-quality signal reaches just past nodes B and C. This shows that an intermediate node (H) can be placed into a location between two other nodes, and it will automatically adjust its transmitted radio frequency power to a level that reaches just beyond the nearest neighboring network nodes (thereby increasing overall network traffic capacity without increasing radio interference by transmitting beyond the necessary distance).

Figure 8:
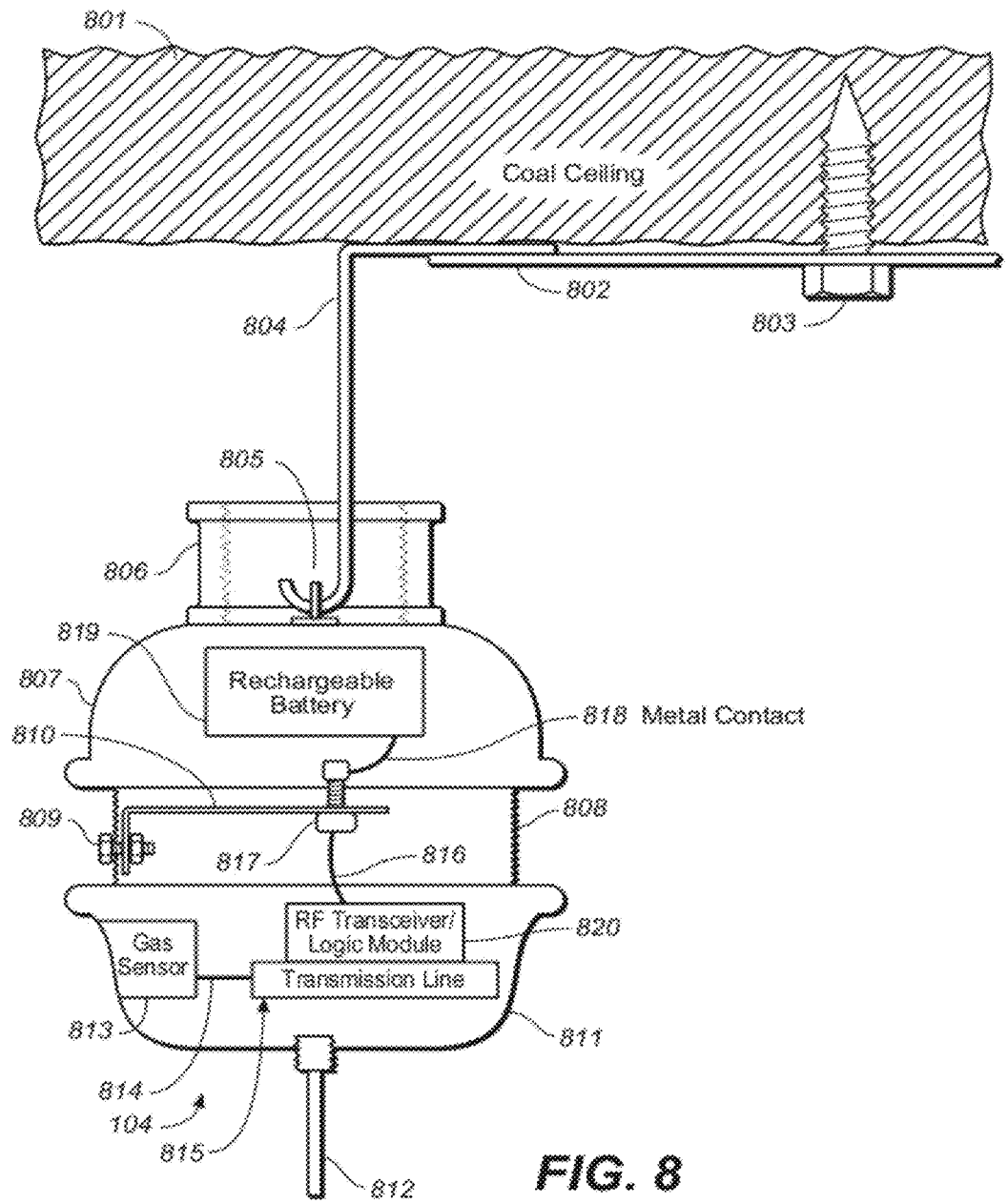
FIG. 8 is a schematic view of a rugged intrinsically safe enclosure for safe underground battery change.

Now referring to FIG. 8, a diagram of a preferred embodiment of a rugged, intrinsically safe (IS) enclosure for safe underground battery change for a preferred embodiment of the wireless peer-to-peer radio/computer subsystem 104, shown here assembled for hanging from a coal mine ceiling 801. Bolt 803 attaches roof plate 802 to coal ceiling 801. Roof plate 802 is slightly flanged to make it easy to force the top (horizontal) portion of L-shaped hanger 804 between the top surface of roof plate 802 and coal ceiling 801, thereby securing hanger 804 to coal ceiling 801.

Hanger 804 has a hook on its bottom end that hooks through hanging eye 805, which in turn is welded directly to the top center of metal top end cap 807. Surrounding, and extending above hanging eye 805, pipe coupler 806 is welded to the top of top end cap 807. On the inside of the lower portion of top end cap 807 are a set of female pipe threads (not shown) that mate to the male pipe threads helically encircling pipe nipple 808. Mounted inside top end cap 807 is rechargeable battery 819. The negative terminal of rechargeable battery 819 is electrically connected to the metal surface of top end cap 807. When the IS enclosure is assembled, top end cap 807 is screwed onto the top of metal pipe nipple 808 using the mating pipe threads so that the negative terminal of rechargeable battery 819 is electrically connected to pipe nipple 808.

Pipe nipple 808 has contact mounting bracket 810 secured to its inside by mounting bolt 809. Contact mounting bracket 810 extends from the inside wall of pipe nipple 808 to just past the horizontal center of the inside of pipe nipple 808. Mounting bracket 810 is made of a non-electrically-conducting material. Electrical contact 817 (made of electrically conductive material, typically a metal) is secured into position and passes through mounting bracket 810.

Electrical contact 817 is dimensioned such that when secured into position and extending through mounting bracket 810, it does not extend past the top or bottom of pipe nipple 808. Extending downward from electrical contact, and electrically connected to electrical contact 817, springy metal contact 816 is dimensioned to reach only far enough to make contact with the electrical terminal on the top of radio frequency transceiver/logic module 820 when the pipe threads on the outside of the bottom of pipe nipple 808 have already engaged with the pipe threads on the inside of the top of bottom end cap 811. When the IS enclosure is assembled, metal bottom end cap 811 is screwed onto the bottom of pipe nipple 808. This brings the negative terminal of rechargeable battery 819 into electrical connection with the metal surface of bottom end cap 811.

Radio frequency transceiver/logic module 820 is mounted in the base or bottom inside of bottom end cap 811. The electrical ground (negative power input terminal) of radio frequency transceiver/logic module 820 is connected to the metal surface of bottom end cap 811. Disposed atop radio frequency transceiver/logic module 820 is an electrical terminal for receiving the DC power from the positive terminal of rechargeable battery 819. When the IS enclosure is assembled, the power from the positive terminal of rechargeable battery 819 passes through springy metal contact 818, electrical contact 817, springy metal contact 816, and finally to the electrical terminal located on the top of radio frequency transceiver/logic module 820. In this manner, radio frequency transceiver/logic module 820 receives its operating electrical power.

Radio frequency transceiver/logic module 820 is electrically connected to antenna 812 via coaxial transmission line 815. Antenna 812 is mounted in the bottom center of bottom end cap 811, with its radiating element extending downward to the outside of bottom end cap 811. The radio frequency transceiver of radio frequency transceiver/logic module 820 uses antenna 812 for radio communications with other compatible radio devices.

The logic component of radio frequency transceiver/logic module 820 controls the data network communications functions of the module, allowing the module to interlink with other similar modules and automatically self-configure for operation in a peer-to-peer or peer-to-multi-peer network architecture.

The logic component may also communicates with a gas sensor 813, receiving sensor output and passing a representation of that output to external systems (such as computer 101 seen in FIG. 1). Gas sensor 813 is preferably mounted on the inside of bottom end cap 811, which includes opening placing gas sensor into fluid communication with the outside (ambient mine) environment and allowing gases to pass into contact with gas sensor 813 for analysis. A seal around gas sensor 813 prevents potentially damaging gases from leaking past gas sensor 813 and into the interior of the IS enclosure. Gas sensor 813 is in communication with radio frequency transceiver/logic module 820 via communications link wire 814.

When the need arises to open and then reassemble the IS enclosure to change rechargeable battery 819, it is necessary for safety to prevent any electrical spark from being exposed to the mine environment. To prevent this, a springy metal contact 818 is connected electrically to the positive contact of rechargeable battery 819. Springy metal contact 818 extends downward from rechargeable battery 819 to a distance that will allow contact with electrical contact 817 only after pipe nipple 808 has already begun threading itself into the interior threads of top end cap 807 during the reassembly of the enclosure. Since top end cap 807 and pipe nipple 808 are both electrically conductive, once thread mating is established, an electrical shield is produced that surrounds the point of contact between springy metal contact 818 and electrical contact 817, thereby preventing any possible spark from being exposed to the mine environment when contact is finally made between springy metal contact 818 and electrical contact 817.

When the need arises to open and then reassemble the IS enclosure to access radio frequency transceiver/logic module 820, it is also necessary for safety to prevent any electrical spark from being exposed to the mine environment. To prevent this, springy metal contact 816 is connected electrically to electrical contact 817 and extends downward from electrical contact 817 a distance that allows for contact with the electrical terminal located on the top of radio frequency transceiver/logic module 820 only after pipe nipple 808 has already begun threading itself into the interior threads of bottom end cap 811 during reassembly of the enclosure. Since bottom end cap 811 and pipe nipple 808 are each electrically conductive, once thread mating commences, an electrical shield is produced that surrounds the point of contact between springy metal contact 816 and the electrical terminal located on the top of radio frequency transceiver/logic module 820, thereby preventing any possible spark from being exposed to the mine environment when contact is finally made between springy metal contact 816 and the electrical terminal located on the top of radio frequency transceiver/logic module 820.

Figure 9:
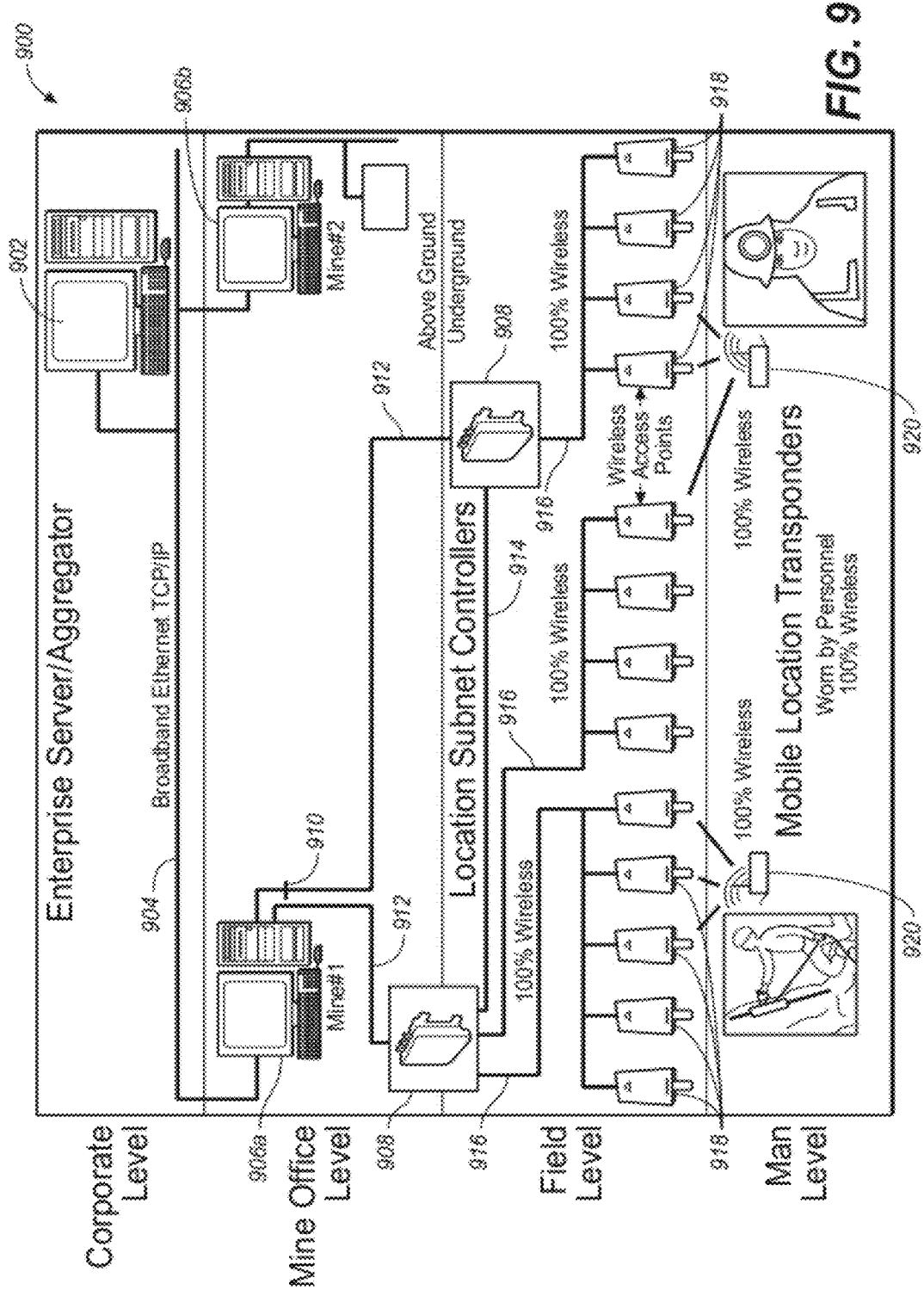
FIG. 9 is a schematic block diagram showing the typical communications hierarchy of the preferred embodiment of the inventive system.

Referring next to FIG. 9, it will be seen that the typical communications hierarchy 900 of the preferred embodiment of the inventive system includes an optional server/aggregator 902, which can be located anywhere in the world, and which has a broadband connection 904 with at least one location network controller 906a located at a first mine site. The server 902 may be in communication other network controllers 906b at other mine sites. In turn, the location network controllers are in communication with one or more location subnet controllers 908, the interconnection including an MSHA barrier 910 at the surface ports when conditions call for such safeguards. The connection is preferably made via RS485 cable or DX-V-bus 912. The subnet controllers are also in communication with one another, either wired or wireless 914.

Still referring to FIG. 9, each subnet controller 908 has a 100% wireless communication link 916 with a plurality of wireless access points 918, creating a subnet system (element 104, as described in FIGS. 1-8). In turn, each wireless access point is in wireless communication with mobile location transponders 920 (202 in FIGS. 1-8), which are worn by mine personnel.

Figure 10:
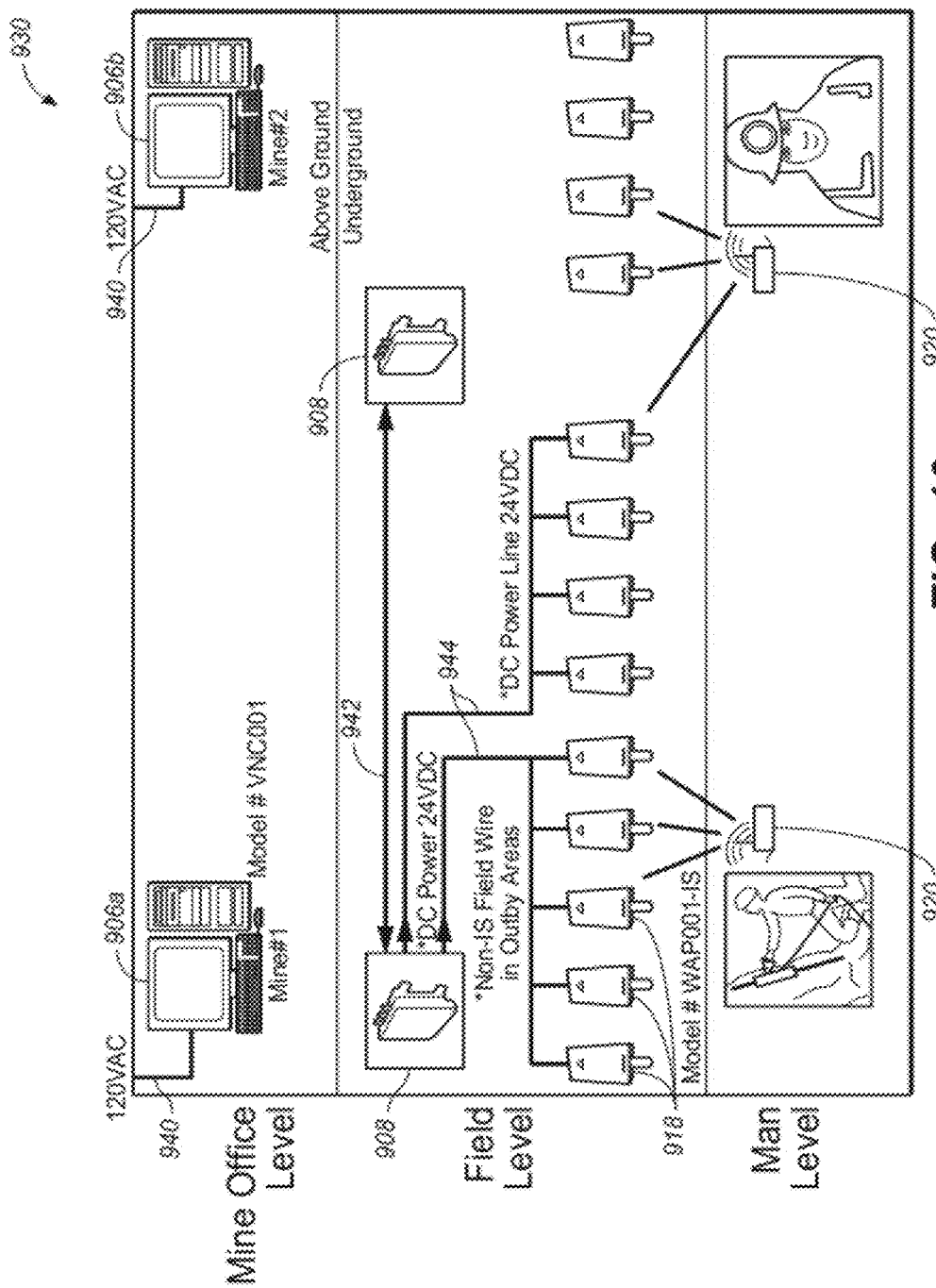
FIG. 10 is a schematic block diagram showing the power distribution system of the present invention.

Next referring to FIG. 10 the power distribution system 930 for the inventive system is shown. Where the installation is in normally fresh areas, standard 120VAC 940 is provided to the location network controllers 906a-b, and mine power 100-250VAC 942 is provided to the subnet controllers 908 as permitted. The wireless access points 918 are provided with 24VDC 944 through the subnet controllers 908, and include 48 hour battery backup and optional 100% battery power. The mobile location transponders 920 are 100% battery powered by non-rechargeable sealed Li-ion wafer cell batteries.

Figure 11:
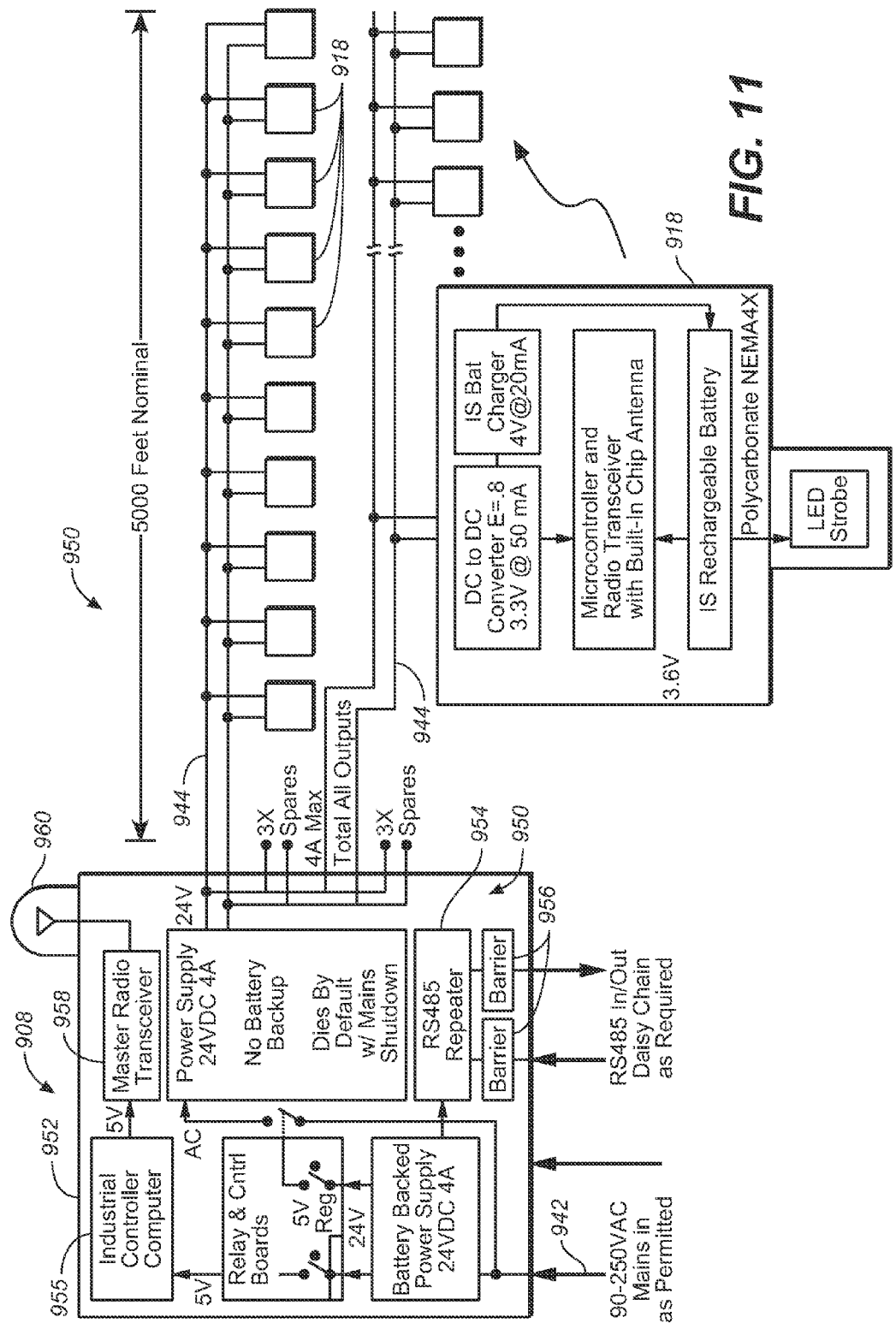
FIG. 11 is a schematic block diagram showing an isolated supply power distribution for system subnet controllers where any associated component is installed in a normally hazardous area.

FIG. 11 shows a non-isolated supply power distribution 950 for system subnet controllers 908 where the associated components are installed in a normally fresh air area. It will be seen that the chains of wireless access points 918 are provided with non-isolated 24VDC power via field wires 944, preferably Carolprene MSHA (black jacket) 12AWG/2 unshielded twisted pairs. The power to the wireless access points dies by default when main power 942 is shut down.

Figure 12:
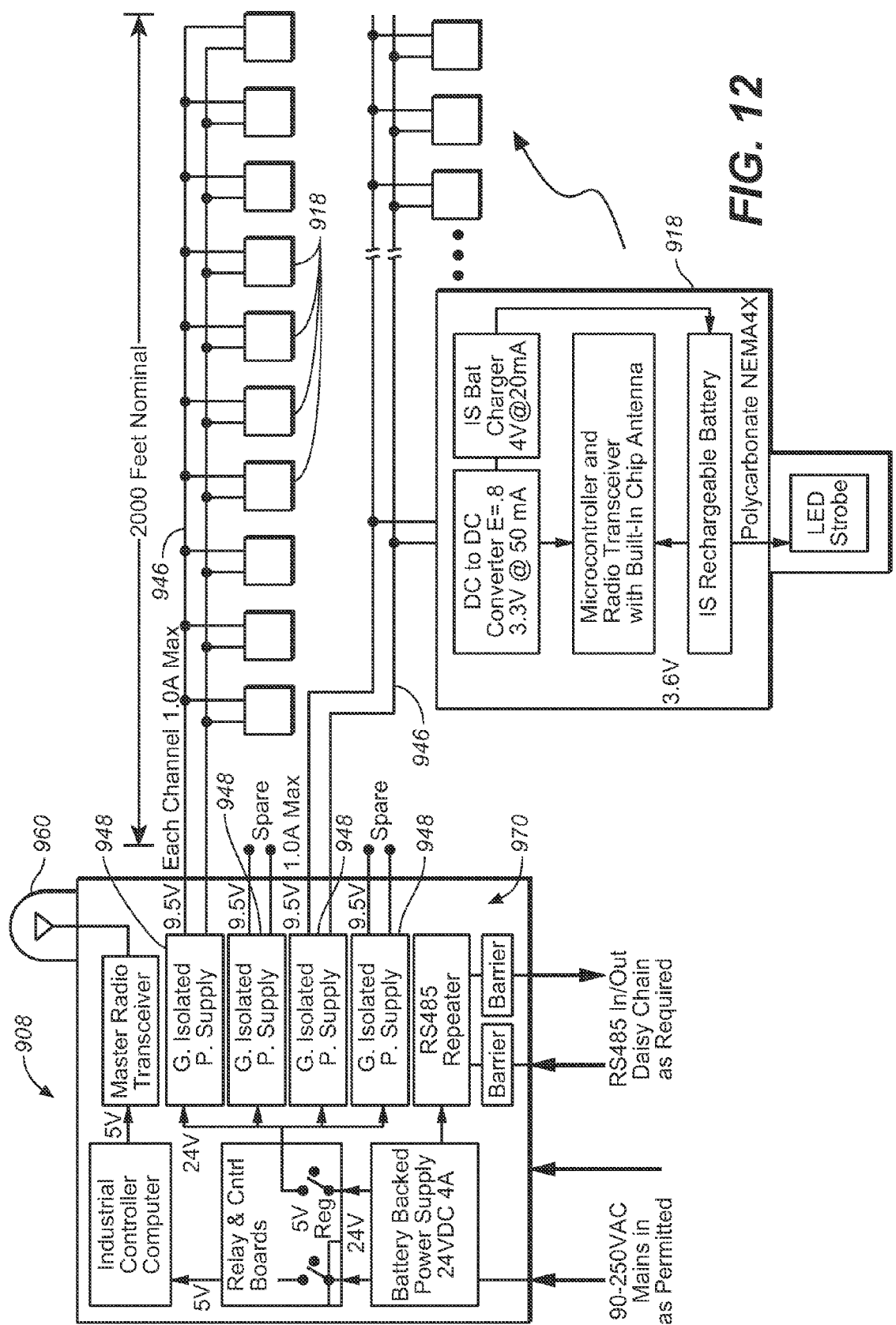
FIG. 12 is a schematic block diagram showing a non isolated supply power distribution for system subnet controllers where all associated components are installed in fresh air areas.

In the preferred embodiment, the subnet controller units 908 are enclosed in a 24×24×10 inch housing 952 and weigh approximately 200 lb fully assembled, or 300 lb on a pedestal with a terminal block. The housing package is EXd coal-dust and methane explosion-proof and flameproof pressure vessel and includes floor mount apparatus. When required the housing is a Class 1 Division 1 housing; otherwise it is a NEMA 4 Division 2 standard enclosure. The main power supply 942 in an intrinsically safe option is a 90-250VAC in 9.5VDC-IS@ 1 A with 4 channels out to the field wires 944; in a non-intrinsically safe option the power supply is 24VDC@4 A output. The backup battery type is a UPS rechargeable, with standard 12 hour backup operation. The operation temperature range is 0 to 85 C, with a storage temperature range of −20 to 85 C. The housing includes LED indicators for Power ON, RX/TX, and Status 1, 2, 3. The interface to the WAPs, mobile tags, and wireless network is 100% over-the-air wireless at 2.4 GHz. The interface to the backbone network in the intrinsically safe option is an RS485 or DX-V-Bus standard backbone data bus 954, though ethernet, fiber-optic, leaky feeder, and other options can be accommodated. MSHA approved IS barriers 956 are provided where required in hazardous environments. The subnet controller CPU 955 runs on a Linux platform, though other generally secure operating systems may be employed and are inherently contemplated in the present disclosure. The subnet controller unit includes a master radio transceiver 958 and antenna 960 for wireless communications with both wireless access points and with the location network controller FIG. 12 shows an isolated supply power distribution 970 for system subnet controllers 908 where any associated component may be installed in normally hazardous areas. All elements are essentially identical to the power distribution in a non-isolated system, but here power to the wireless access points 918 is divided and isolated by a plurality of isolated power supplies 948 into 9.5VDC field wire runs 946 and provided by MSHA (blue jacket) 12AWG/3 unshielded twisted pairs with two conductors permitted for ground returns for reduced resistance.

Thus by this explanation, along with reference to the included figures, the necessary elements, features and functions of the present invention are disclosed. However, while there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which are defined by the claims herein.

What is claimed as invention is:

1. A wireless mine monitoring, tracking, and communications network, comprising:
    at least one network controller installed at the mine office level and running application control software for remotely monitoring all connected devices in the network;
    a plurality of active wireless transponders wearable by personnel entering and exiting mines and/or installable on equipment moving into, used throughout, and exiting mines, wherein said wireless transponders include transceivers;
    at least one location subnet controller in wireless or wired or a combination of wired and wireless electronic communication with one or more of said at least one network controller and having an integral battery power supply;
    a plurality of wireless access points, each in wireless communication with at least one of said subnet controllers, said wireless access points installed at the field level in the entries and crosscuts of an underground mine, said wireless access points also in wireless communication with said active wireless transponders for tracking said active wireless transponders and for making emergency communications available to miners, each of said wireless access points having an integral battery power supply; and
    an automatic self-healing system for automated self-healing fail-over in the event that one of said plurality of wireless access points fails to function, said automatic self-healing system including at least a hop-over link recovery system;
    wherein said plurality of active wireless transponders, said plurality of wireless access points, said at least one location subnet controller, and said at least one network controller are linked with one another through bi-directional network communications links, said bi-directional communications links including bi-directional voice and data communications to provide full-duplex streaming of voice data across a hierarchical mesh network topology;
    wherein in the event of a catastrophic emergency that destroys a portion of said network, such that at least one of said wireless access points or subnet controllers fails to function, or when there is an accident that disrupts the primary or normal path of data transfer, said automatic self-healing system applies a rerouting/recovery/and failover mechanism;
    and wherein said integral battery power supply, said active wireless transponders, said wireless access points, and said at least one location subnet controller are intrinsically safe.

2. The network of claim 1, further including at least one enterprise server installed at the corporate office level, said enterprise server running application software for said system and having a broadband network connection to said network controllers, wherein said application software enables monitoring of a plurality of mines via a global network system.

3. The network of claim 1, wherein said subnet controllers are in wired or wireless communication, including the transmission of voice communications, with at least one wireless access point in a distributed hierarchical architecture in which said subnet controllers are in communication with each other and said at least one network controller to orchestrate complex rapid processing required for life-saving with predictable high performance on large scales.

4. The network of claim 3, wherein said subnet controllers are un-tethered wireless peer-to-peer radio/computer subsystems.

5. The network of claim 4, wherein said un-tethered wireless peer-to-peer radio/computer subsystems are low power battery powered digital radios.

6. The network of claim 4, wherein said un-tethered wireless peer-to-peer radio/computer subsystems utilize high level communications protocol devised for use with compact low-power digital radios based on a standard accepted for wireless personal area networks (WPANs), and having a long battery life and secure networking.

7. The network of claim 1, further including a plurality of permanently mounted active wireless transponder devices disposed in fixed locations throughout a mine for performing system calibration and self-testing functions.

8. The network of claim 1, wherein said application software logs the status and communications of all active wireless transponders along with their physical location.

9. The network of claim 1, wherein said application software self-monitors health-check parameters for continuously assessing network status, such that when predetermined thresholds are reached, said system software automatically takes corrective action, triggers alarms as appropriate, issues trouble alerts, and manages all connected devices in said network.

10. The network of claim 1, further including at least one handheld location sniffer for detecting and identifying beacon signals from an active wireless transponder.

11. The network of claim 1, wherein said subnet controllers and said wireless access points comprise backbone wireless subnetworks disposed in self-healing networks.

12. The network of claim 11, wherein said subnetwork consists of about 25 of said wireless access points covering approximately 5000 linear feet of tunnel entry and crosscut per subnetwork, wherein the number and spacing of said wireless access points is varies according to the tunnel propagation characteristics in each locale of each mine, according to tunnel height, width, undulations, bends, and other characteristics present in the tunnel environment, and further wherein the number and spacing of said wireless access points is determined with the aid of real-time link strength/quality measurement meter built into said wireless access points as the meter is employed during deployment.

13. The network of claim 1, wherein said subnet controllers and said wireless access points comprise backbone wireless subnetworks that are disposed in a double redundant topology.

14. The network of claim 1, further including at least one dedicated subnet controller programmed with high speed sweep application software for rapidly determining the location of large numbers of miners in congested areas.

15. The network of claim 1, wherein said wireless access points are powered using hybrid battery-plus-wired-power circuits.

16. The network of claim 1, further including a rapid deployment all-battery version of said network for healing a portion of said network in a worst-case post-accident failure of some part of said network.

17. The network of claim 1, wherein said application software provides a user interface accessible via any standard client-based web-browser, and further wherein said application software runs in a standalone mode to provide a user interface when disconnected from a global communications network.

18. The network of claim 17, wherein said user interface views are organized to provide location data including active wireless transponder symbols populating a graphical mine map, and said user interface allows drag-and-drop of wireless transponder symbols onto said graphical mine map for intuitive rendering of location information, miner identity and status.

19. The network of claim 18, wherein said application software includes means for drill-down into progressively higher levels of detail of said graphical mine map.

20. The network of claim 1, wherein said plurality of wireless access points includes portable wireless access points and pre-installed fixed wireless access points, and wherein said application software differentiates said portable wireless access points from said pre-installed fixed wireless access points, such that at least some of said portable wireless access points may comprise a new subnet that the network can adopt, and further including a portable rapid-deployment network of all-battery-powered nodes capable of operating in Rescue-Comm or ReachComm mode, to provide full-roaming voice services and data services through at least said new subnet.

21. The network of claim 1, wherein said network is automatically self-aware of the status and location of all elements comprising said network.

22. The network of claim 1, further including location estimating means including means to measure RSSI between said plurality of active wireless transponders and each and all of said wireless access points in said plurality of wireless access points within the variable range of said active wireless transponders.

23. The network of claim 22, wherein said location estimating means further includes means to measure LQI between said plurality of active wireless transponders and each and all of said wireless access points in said plurality of wireless access points within the variable range of said active wireless transponders.

24. The network of claim 23, wherein said automatic location estimating means includes automated RF self-calibration means for using the known approximate distance between one of said plurality of wireless access points and one of said plurality of active wireless transponders to calibrate the RSSI measurements.

25. An intrinsically-safe wireless mine monitoring, tracking, and communications network, comprising:
   at least one network controller running application control software;
   at least one location subnet controller running application control software and acting as a distributed compute-center in bi-directional electronic communication with one or more of said at least one network controller;
   a plurality of active wireless transponders wearable by personnel entering and exiting mines and/or installable on equipment moving into, used throughout, and exiting mines, wherein said wireless transponders include two-way voice and/or text and/or location services transceivers;
   a plurality of wireless access points in bi-directional wireless communication with each other and with at least one of said subnet controllers, said wireless access points installed at the field level in at least the entries and crosscuts of an underground mine, said wireless access points also in bi-directional wireless communication with said active wireless transponders for tracking said active wireless transponders and for making emergency communications available to miners and rescuers;
   an energy efficient power supply and power-design incorporating intelligent sleep functions capable of operating for at least several days on small intrinsically safe batteries; and
   a set of permanently mounted tags in fixed locations throughout the mine as calibrators that provide self-report reference points at known locations;
   wherein said application control software utilizes said subnet controllers, wireless access points, active transponders, and permanently mounted tags to provide precise location determination routinely updated mine-wide for all miners wearing an active transponder, said location determination means including at least,
      (a) precise algorithms utilizing RSSI plus LQI, plus RF vector-gradient, combined to perform probabilistic triangulation calculations to mitigate errors in ordinary RSSI algorithms,
      (b) system self-calibration using real-time statistical analysis of actual tunnel RF parametrics including at least absorptive loss effects, multipath, other constructive/destructive interference effects, waveguide effects, tunnel bend effects, blockages/stoppings, and other sources of aliasing, so as to reduce common sources of error that otherwise limit the accuracy that can be achieved using ordinary RF propagation models for underground tunnels,
      (c) human movement heuristics, knowledge of specific wearer characteristics, tunnel boundary and stopping data, filtering, and time averaging in algorithms optimized for precise location in underground mining;
   wherein said location determination means provides high-precision miner location capability which is able to locate miners within 2-25 meters;
   and further wherein said network uses a hierarchical distributed computing architecture and an orchestrated pull protocol running on backbone wireless subnetworks, each of said subnetworks including a plurality of wireless access points to cover a predetermined length of tunnel entry and crosscut, such that said network is scalable to any size mine and real-world mine-wide load.

26. The network of claim 25, further including system redundancy and smart command failover/corrective-action to each and every network element such that said network has structural and system integrity sufficient to survive mine accidents with greater than 90% functionality remaining after such accidents.

27. The network of claim 25, wherein said network is enabled for use with either a low bandwidth backhaul, including twisted-pair RS485 or Through-The-Earth wireless, or a high bandwidth backhaul, including fiber optic, wireless peer-to-peer, coaxial cable, Ethernet, and/or any combination thereof.

* * * * *